United States Patent
Vidal et al.

(10) Patent No.: US 9,518,466 B2
(45) Date of Patent: Dec. 13, 2016

(54) HYDRAULIC APPARATUS HAVING AN IMPROVED STRUCTURE FOR ITS COMMISSIONING

(71) Applicant: Poclain Hydraulics Industrie, Verberie (FR)

(72) Inventors: Stephane Vidal, Verberie (FR); Herve Desumeur, Verberie (FR); Jean Heren, Verberie (FR); Clement Recoura, Verberie (FR); Gilles Lemaire, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 14/431,762

(22) PCT Filed: Sep. 19, 2013

(86) PCT No.: PCT/EP2013/069523
§ 371 (c)(1),
(2) Date: Mar. 26, 2015

(87) PCT Pub. No.: WO2014/048842
PCT Pub. Date: Apr. 3, 2014

(65) Prior Publication Data
US 2015/0247404 A1 Sep. 3, 2015

(30) Foreign Application Priority Data

Sep. 28, 2012 (FR) ..................................... 12 59193
Apr. 25, 2013 (FR) ..................................... 13 53800

(51) Int. Cl.
*F01B 3/00* (2006.01)
*B60K 17/356* (2006.01)
(Continued)

(52) U.S. Cl.
CPC ............ *F01B 3/0002* (2013.01); *B60K 17/105* (2013.01); *B60K 17/356* (2013.01); *F01B 3/0091* (2013.01);
(Continued)

(58) Field of Classification Search
CPC ........ F01B 3/002; F01B 3/0091; B60K 17/05; B60K 17/356; F04B 1/047; F04B 1/107; F04B 49/02
(Continued)

(56) References Cited

U.S. PATENT DOCUMENTS

| | | | |
|---|---|---|---|
| 5,263,401 A | 11/1993 | Walker | |
| 5,630,708 A * | 5/1997 | Kushida | F04B 1/053 417/273 |

(Continued)

FOREIGN PATENT DOCUMENTS

| | | |
|---|---|---|
| DE | 91 04 126 U1 | 8/1992 |
| EP | 1 355 068 A1 | 10/2003 |

(Continued)

*Primary Examiner* — Jacob Knutson
(74) *Attorney, Agent, or Firm* — Blakely Sokoloff Taylor & Zafman LLP

(57) ABSTRACT

The invention relates to a hydraulic apparatus (1) including: a casing (6) defining a first assembly; a shaft (2) defining a second assembly; said first and second assemblies being freely rotatable relative to one another; a multi-lobe cam (3) rotatably connected to one of said first or second assembly; a dispenser (51) and a dispenser cover (52); a cylinder block (4) mounted such as to be freely rotatable relative to said first and second assemblies and including a means for rotatably engaging relative to the other of said assemblies, characterized in that the hydraulic apparatus (1) includes a return means for moving the cylinder block (4) in order to rotatably disengage same from said first or second assembly, and in that the dispenser (5) is configured, when applying (Continued)

Figure 1:
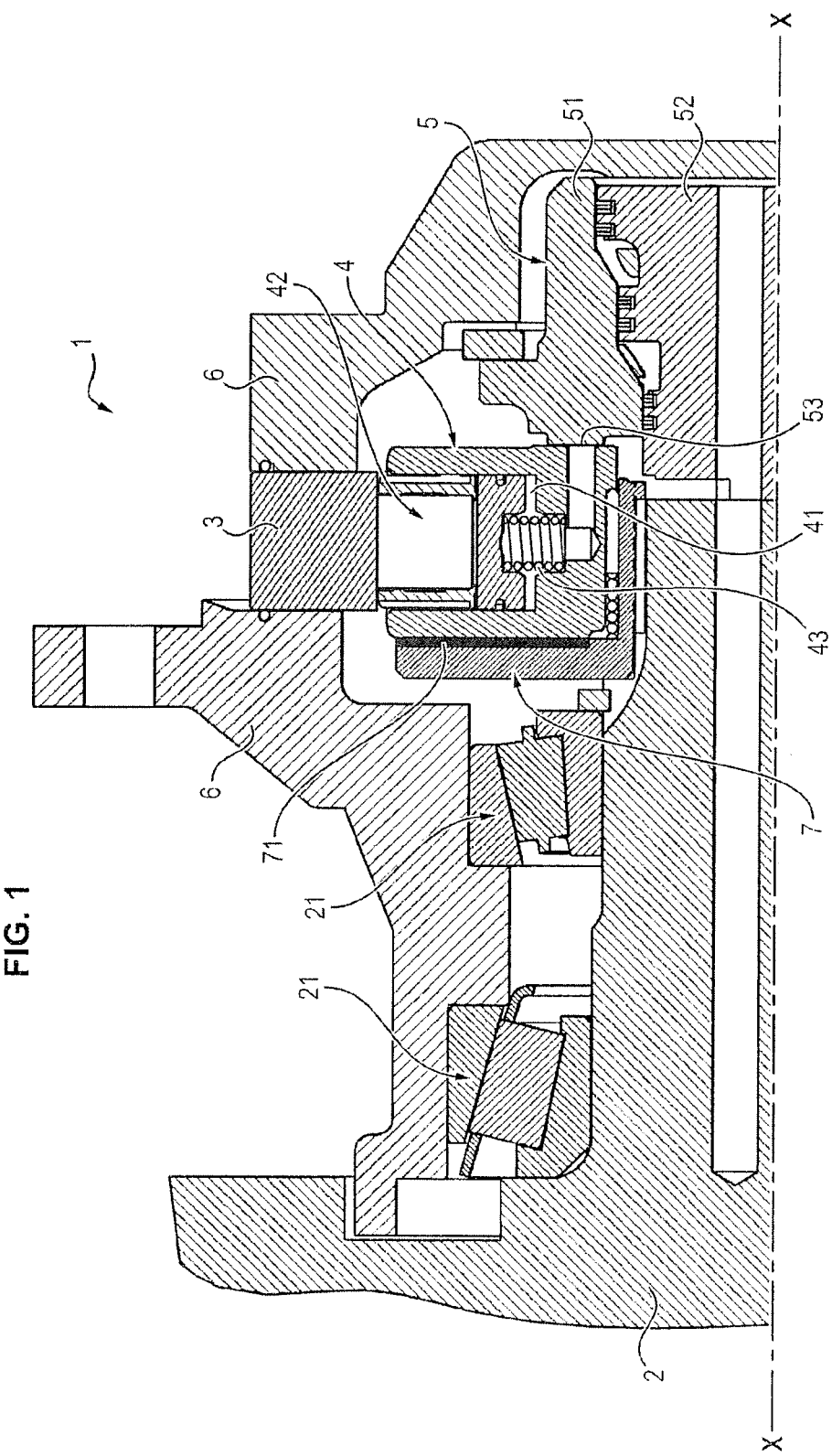

pressure, to rotatably engage the cylinder block (4) relative to the other of said first or second assembly.

16 Claims, 16 Drawing Sheets

(51) Int. Cl.
| | |
|---|---|
| B60K 17/10 | (2006.01) |
| F04B 1/047 | (2006.01) |
| F04B 1/107 | (2006.01) |
| F04B 49/02 | (2006.01) |
| B60K 17/16 | (2006.01) |

(52) U.S. Cl.
CPC ............... *F04B 1/047* (2013.01); *F04B 1/107* (2013.01); *F04B 49/02* (2013.01); *B60K 17/165* (2013.01)

(58) Field of Classification Search
USPC ..... 91/476, 488, 489, 491, 492, 72; 180/243
See application file for complete search history.

(56) References Cited

U.S. PATENT DOCUMENTS

| | | | |
|---|---|---|---|
| 2008/0295790 A1* | 12/2008 | Calalay | F02B 75/045 123/90.61 |
| 2010/0225157 A1* | 9/2010 | Kirby | F16D 31/02 301/131 |
| 2011/0139532 A1* | 6/2011 | Sashikuma | B60K 17/356 180/242 |
| 2011/0253488 A1* | 10/2011 | Vidal | F16D 59/02 188/67 |
| 2012/0031263 A1* | 2/2012 | Souply | F03C 1/0409 91/476 |

FOREIGN PATENT DOCUMENTS

| | | |
|---|---|---|
| FR | 2 901 581 A1 | 11/2007 |
| GB | 2 068 474 A | 8/1981 |

* cited by examiner

HYDRAULIC APPARATUS HAVING AN IMPROVED STRUCTURE FOR ITS COMMISSIONING

GENERAL TECHNICAL FIELD

The present invention relates to the field of hydraulic apparatuses and associated means for the commissioning of such hydraulic apparatuses.

PRIOR ART

Throughout the present text, hydraulic apparatus will denote an apparatus which can function as a motor or hydraulic pump, and being for example controlled by means of the inclination of a control panel of said hydraulic apparatus. A hydraulic apparatus conventionally comprises a plurality of pistons arranged in housings, and describing out-and-back movements in contact with a cam.

Hydraulic apparatuses having a free wheel configuration are known, that is, a configuration in which the hydraulic apparatus operates without pressure and without fluid flow and more particularly where the pistons are not in contact with the cam, such a configuration being for example advantageous on engines having mixed work conditions. Opposed to this free wheel configuration is the work configuration in which the pistons are in contact with the cam, and the hydraulic apparatus operates with a pressure and fluid flow.

A hydraulic transmission typically comprises a hydraulic apparatus which is in free wheel configuration when the hydraulic transmission is not solicited, and shifts to the work configuration when solicited.

This shift from the free wheel configuration to the work configuration is done by extending of the pistons which are put into contact with the cam, or more precisely their free ends are placed in contact with the cam. This shift from the free wheel configuration to the work configuration is called commissioning of the hydraulic apparatus, and corresponds to the application of a flow to the hydraulic apparatus.

Commissioning can be done statically or dynamically.

Static commissioning involves the immobilisation of the different components, and is therefore highly restrictive in terms of use.

In dynamic mode, commissioning causes instantaneous flow, which the flow feed sources cannot provide. This involves the pistons not all being in contact instantaneously against the cam, and therefore causes noise.

Also, commissioning such as commonly performed in such hydraulic apparatuses causes shocks during contacting of pistons on the cam, which has a direct impact on the service life of the motor, as well as noise, which is unpleasant for the user, whether the commissioning is carried out statically or dynamically. Also, commissioning of the hydraulic apparatus is not always instantaneous, as it needs to bring out enough oil to extend all the pistons.

PRESENTATION OF THE INVENTION

The aim of the present invention is to propose a system having no such disadvantages.

For this purpose, the invention proposes a hydraulic apparatus with radial pistons, comprising:
a casing defining a first assembly,
a shaft defining a second assembly, said first and second assemblies being free in rotation one relative to the other,
a multilobe cam connected in rotation to one of said first or second assemblies,
a distributor and a distributor lid,
a cylinder block mounted in free rotation relative to said first and second assemblies, and comprising a plurality of cylinders in which pistons are arranged guided to slide radially in respective cylinders of the cylinder block and supported on the lobes of the cam, said apparatus comprises support springs arranged in said cylinders so as to keep the pistons supported against the cam,
characterized in that said hydraulic apparatus also comprises rotation engagement means adapted, during the application of a command, to immobilise the cylinder block relative to the other of said first or second assemblies.

Said hydraulic apparatus typically has one or more of the following characteristics, taken independently or in combination:
said engagement means are adapted to provide engagement by friction of said cylinder block with said first or second assembly;
one of said support springs has stiffness greater than the stiffness of said other support springs so as to define indexation of the cylinder block relative to the cam when the cylinder block is free in rotation relative to said first and second assemblies.

The cam is typically:
either connected in rotation to the shaft, the engagement means being adapted to connect in rotation the cylinder block to the casing;
or connected in rotation to the casing, the engagement means being adapted to connect in rotation the cylinder block to the shaft.

With the hydraulic apparatus further comprising advantageously a synchronisation piston connected in rotation to the other of said first or second assemblies and adapted to cooperate with a housing arranged in the cylinder block, said housing forming a angular sector so as to define two stop positions of the synchronisation piston in said housing, said two stop positions defining two configurations of internal conduits of the distributor and of the cylinder block corresponding to the two directions of rotation of the mobile assembly of said hydraulic apparatus, said synchronisation piston being configured so as to position the cylinder block in the stop position adapted prior to the immobilisation by the engagement means of the cylinder block relative to the other of said first or second assemblies.

According to a particular embodiment, said engagement means comprise
return means tending to displace the cylinder block to disengage it in rotation relative to the other of said first or second assemblies, and
internal conduits of the distributor configured, during the application of pressure, to engage the cylinder block in rotation relative to the other of said first or second assemblies.

According to another particular embodiment said engagement means comprise an electro-magnet, configured, during its activation, so as to generate a magnetic field which causes an attraction force between the cylinder block and a friction element so as to immobilise the cylinder block relative to said first or second assembly.

According to a particular embodiment said engagement means comprise a device with teeth and grooves arranged on the engagement means adapted to cooperate with teeth and grooves arranged on the cylinder block or on said first or second assembly so as to immobilise the cylinder block relative to said first or second assembly.

According to a particular embodiment, said engagement means comprise
- a sealed chamber filled with oil and housing discs connected in rotation to the cylinder block and to the other of said first or second assemblies, and
- a control chamber adapted to control the pressure inside the sealed chamber, so as to provide engagement by visco-coupling.

The invention also relates to a system comprising at least two hydraulic apparatuses such as defined previously, in which a first of said hydraulic apparatuses is connected to a principal motor via a clutch so as to function as a pump, and feed via a hydraulic circuit a second of said hydraulic apparatuses operating as a motor to provide assistance on a drive shaft of a vehicle wheel, said first and second hydraulic apparatuses comprising a common drain line for their respective casings connected to said hydraulic circuit via check valves.

The invention also relates to a system comprising at least one hydraulic apparatus such as defined previously operating as a motor and each mounted on a driven axle of a vehicle, and a hydraulic pump with variable displacement, said system further comprising a calculator adapted to control displacement of the hydraulic pump such that displacement of the hydraulic pump multiplied by its drive speed in rotation is equal to displacement of the total of said hydraulic motors multiplied by the drive speed of the hydraulic driven motors connected to the axles plus Epsilon, where Epsilon represents sliding which produces a traction effect.

The invention also relates to a vehicle comprising a primary motor driving in rotation a primary axle defining the motorised wheels of the vehicle, and a secondary axle, said vehicle comprising a primary hydraulic apparatus such as defined previously mounted on said primary axle so as to be driven in rotation at the same speed as said motorised wheels, and a secondary hydraulic apparatus such as defined previously mounted on the secondary axle so as to be driven in rotation at the same speed as the wheel(s) mounted on said secondary axle, said primary and secondary hydraulic apparatuses being connected so as to enable driving of the secondary axle by the secondary hydraulic apparatus during the commissioning of said hydraulic apparatuses.

The invention also relates to a method for displacement of a hydraulic apparatus comprising a casing defining a first assembly, a shaft defining a second assembly, said first and second assemblies being free in rotation one relative to the other, a multilobe cam connected in rotation to one of said first or second assemblies, a cylinder block mounted free in rotation relative to said first and second assemblies, and comprising a plurality of cylinders in which are arranged pistons guided to slide radially in respective cylinders of the cylinder block, supported on the lobes of the cam and being held supported against the cam, said method being characterized in that immobilisation of the cylinder block relative to the other of said first or second assemblies is controlled so as to cause displacement of the hydraulic apparatus.

Immobilisation of the cylinder block relative to the other of said first or second assemblies is advantageously carried out by application of pressure in a distributor of said hydraulic apparatus driving the displacement of said distributor so that it acts on the cylinder block to immobilise it relative to the other of said first or second assemblies.

PRESENTATION OF FIGURES

Figure 2:
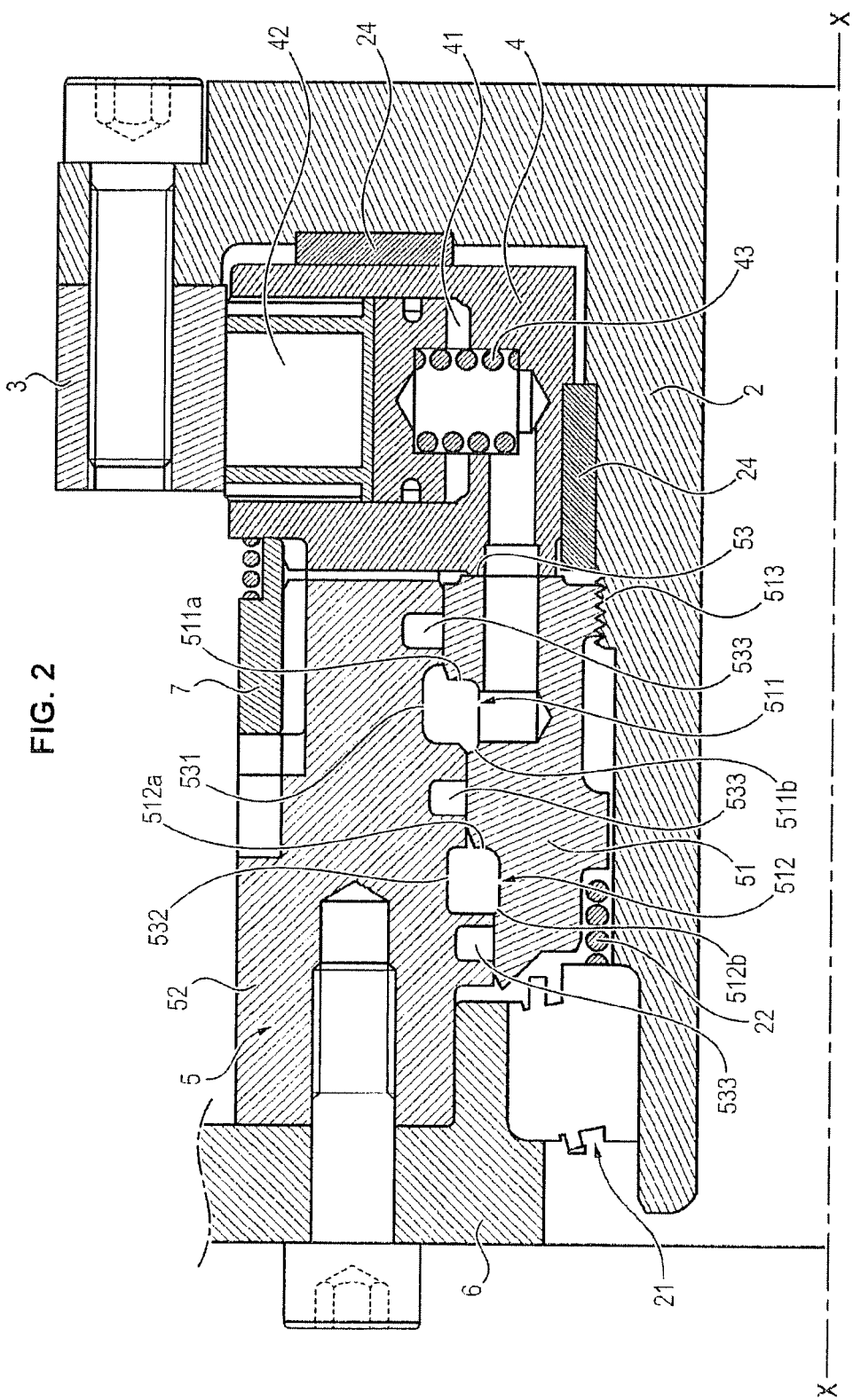
Figure 9:
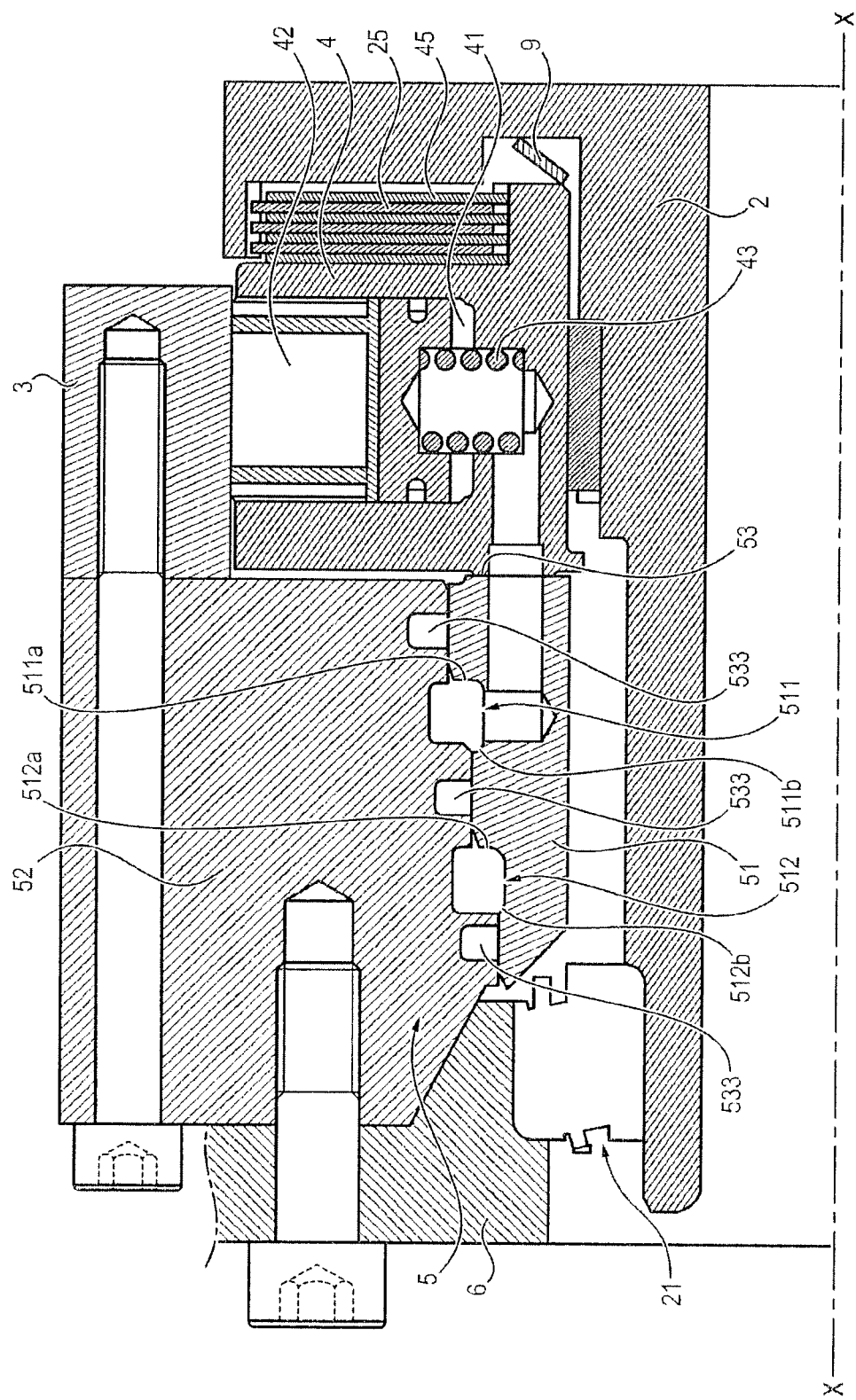
Figure 10:
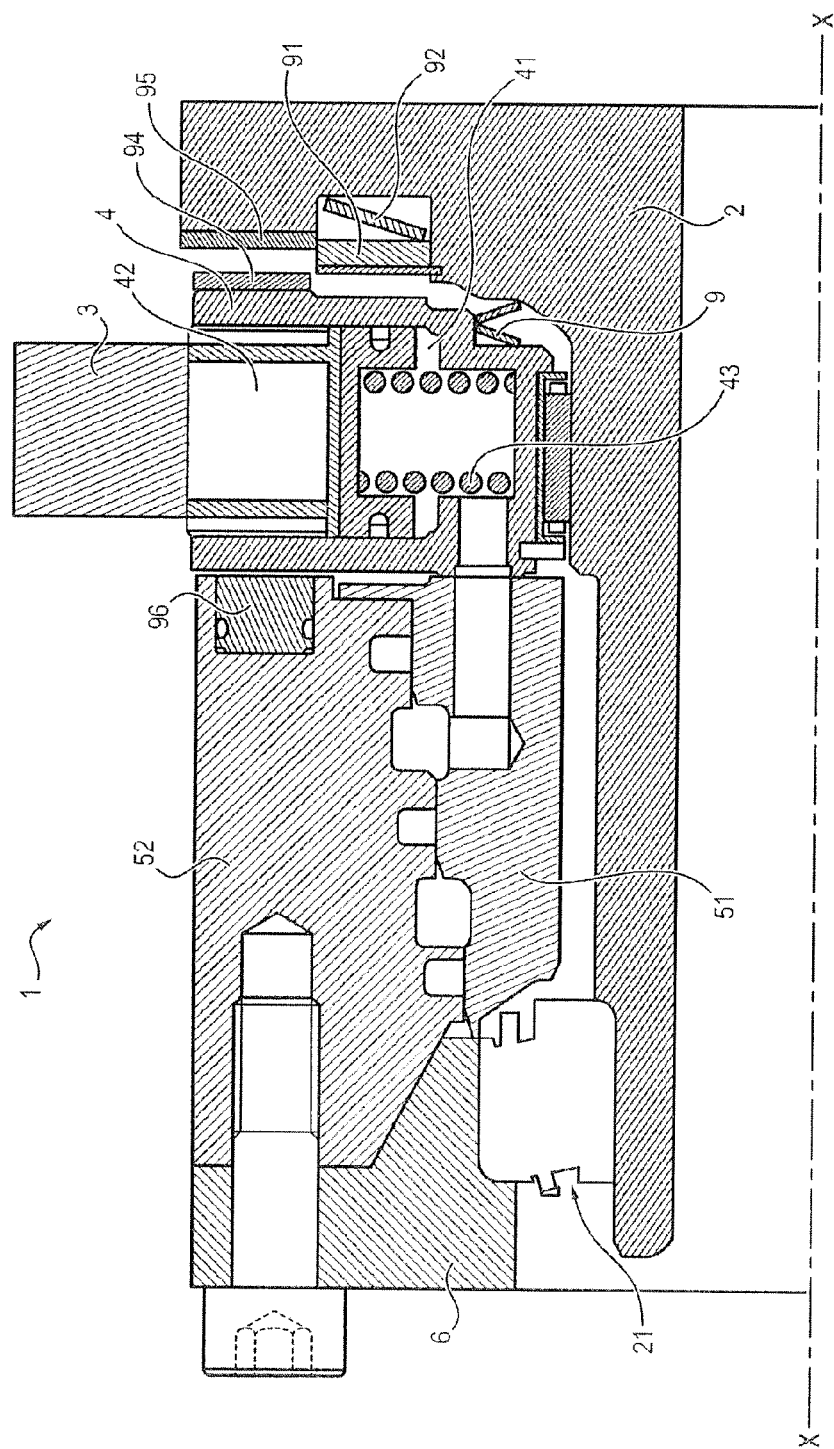
Figure 11:
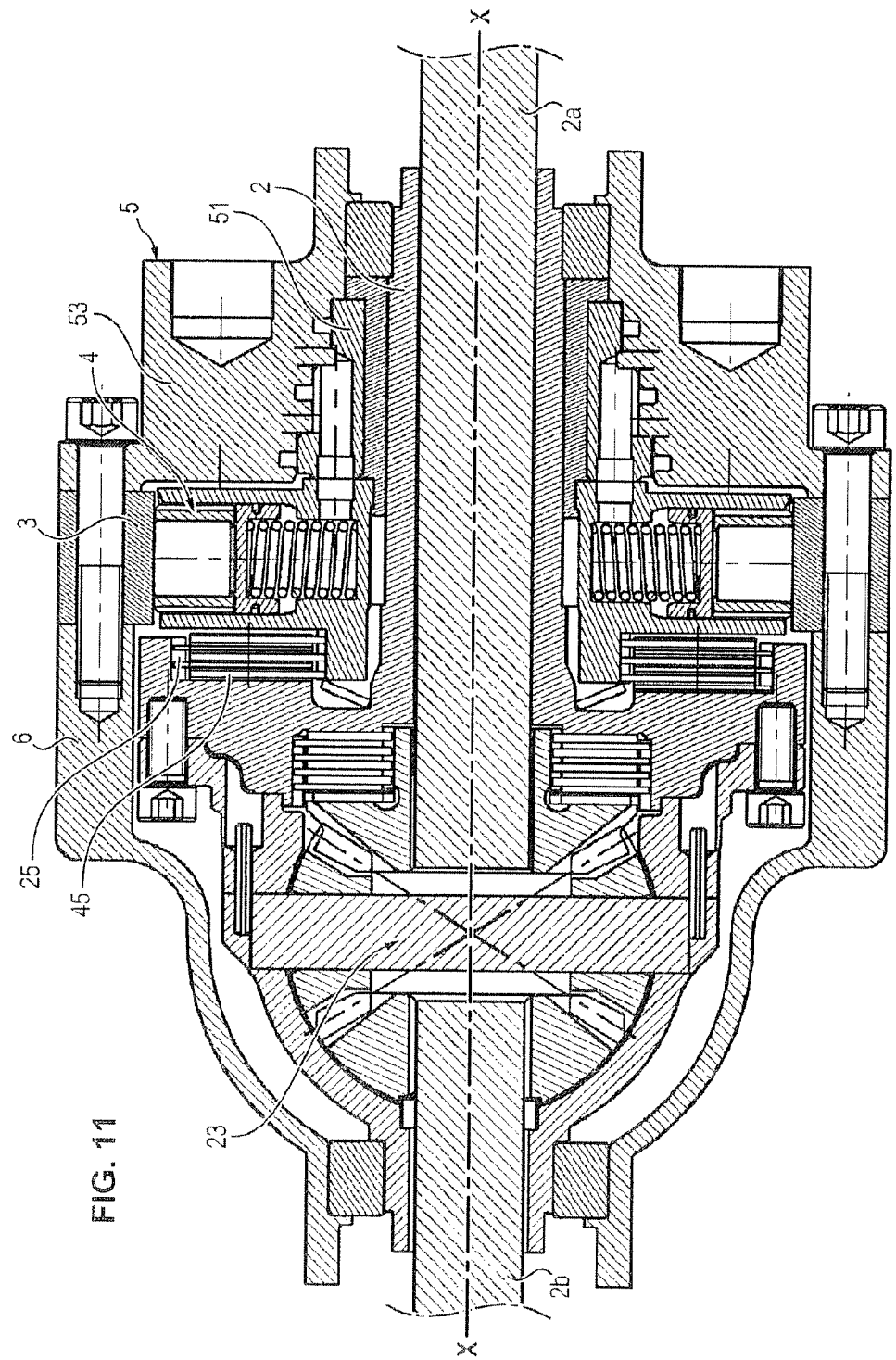
Figure 12:
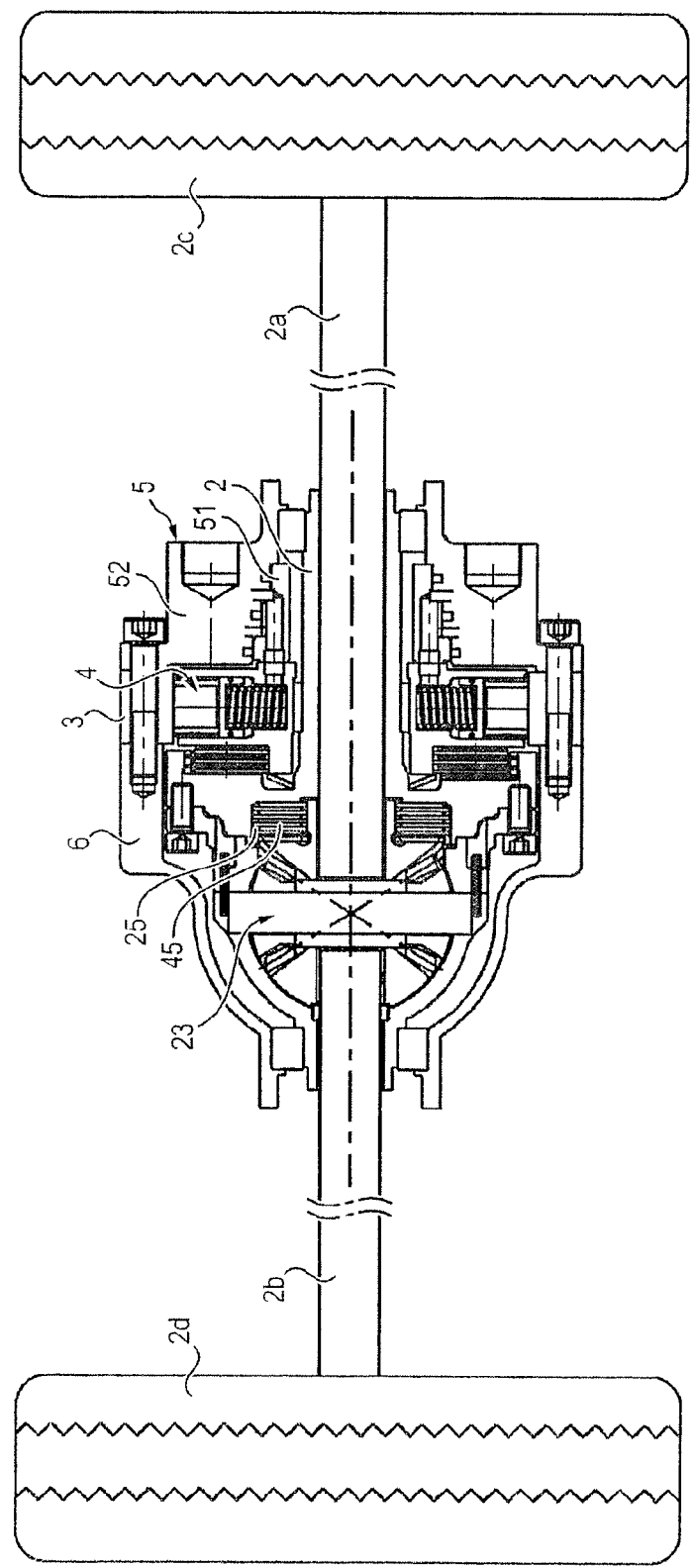
Figure 13:
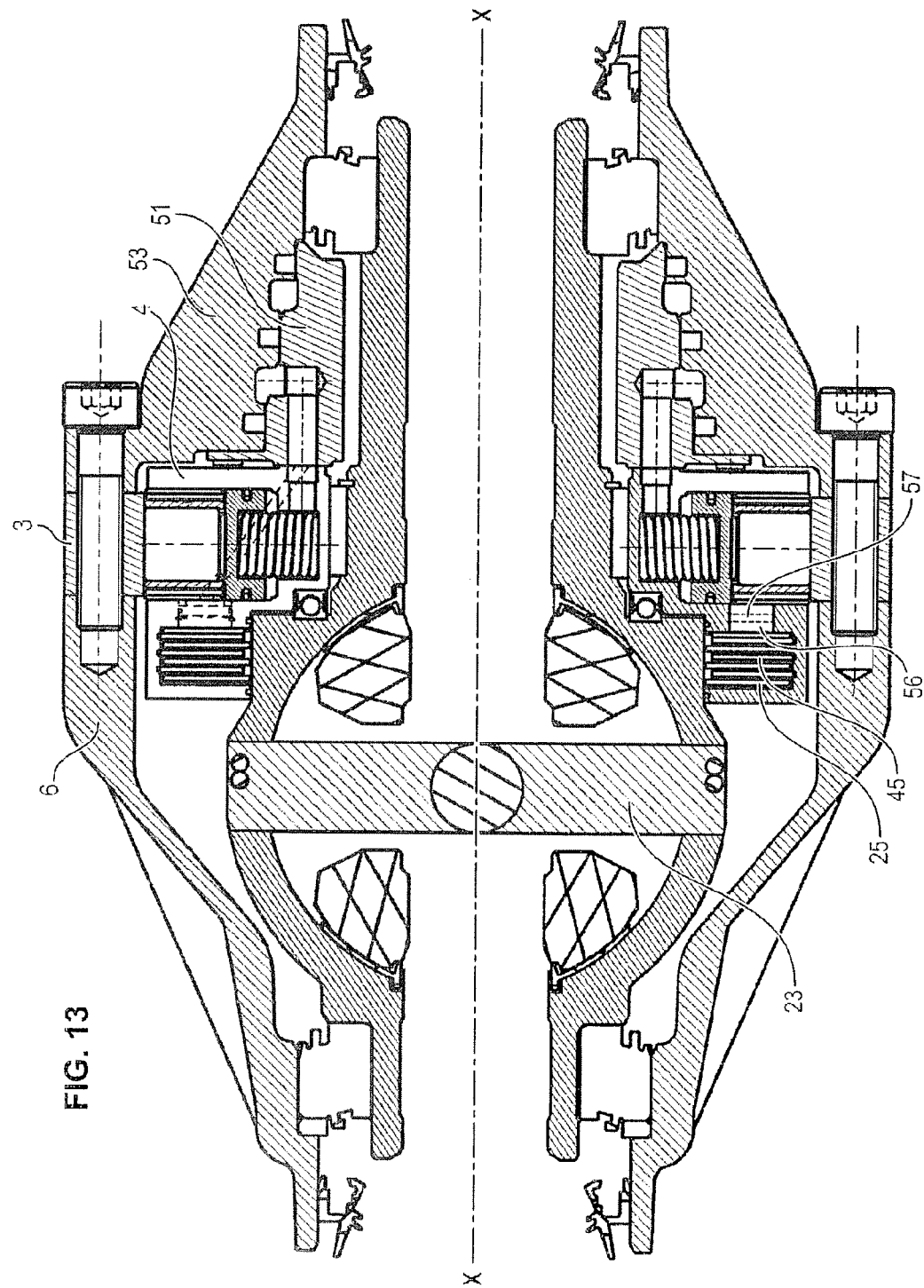
Figure 14:
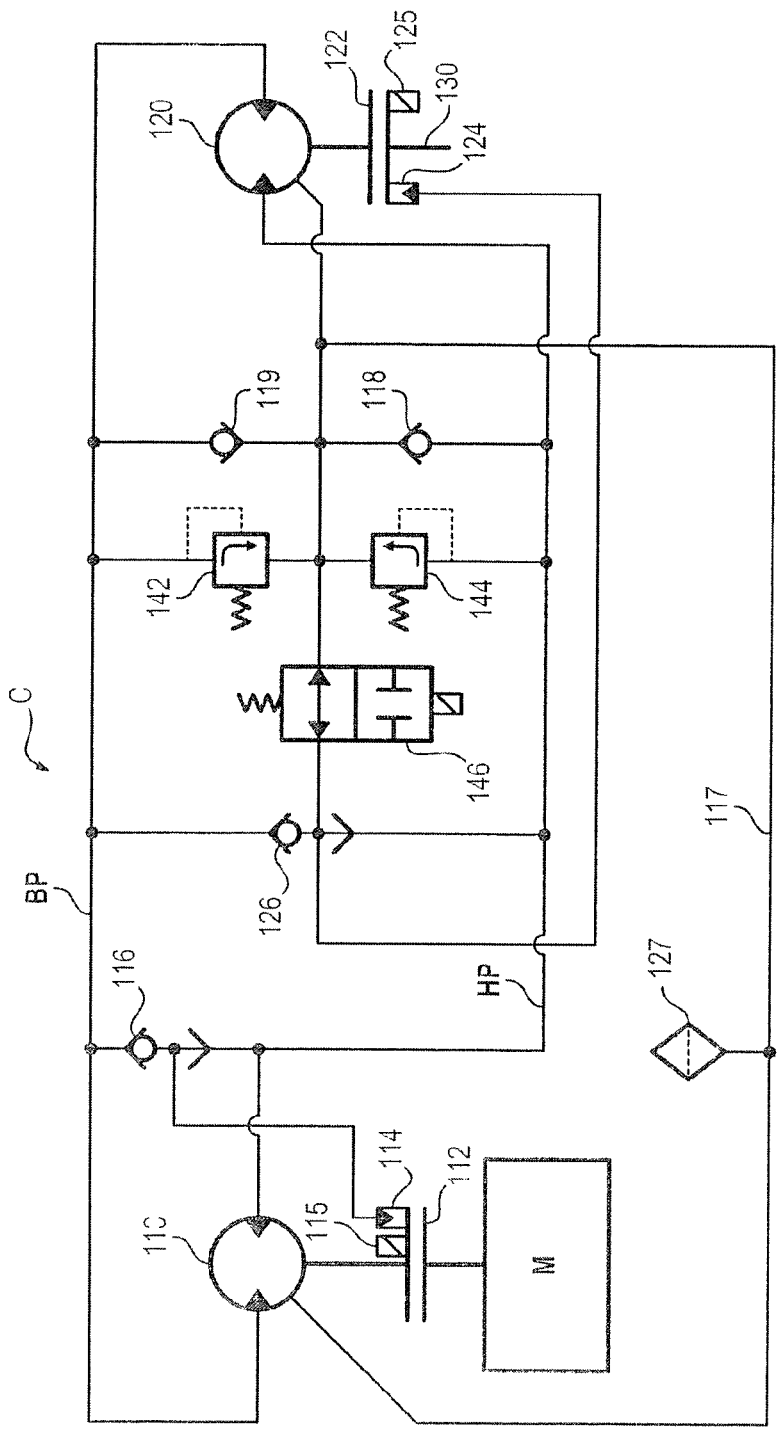
Figure 15:
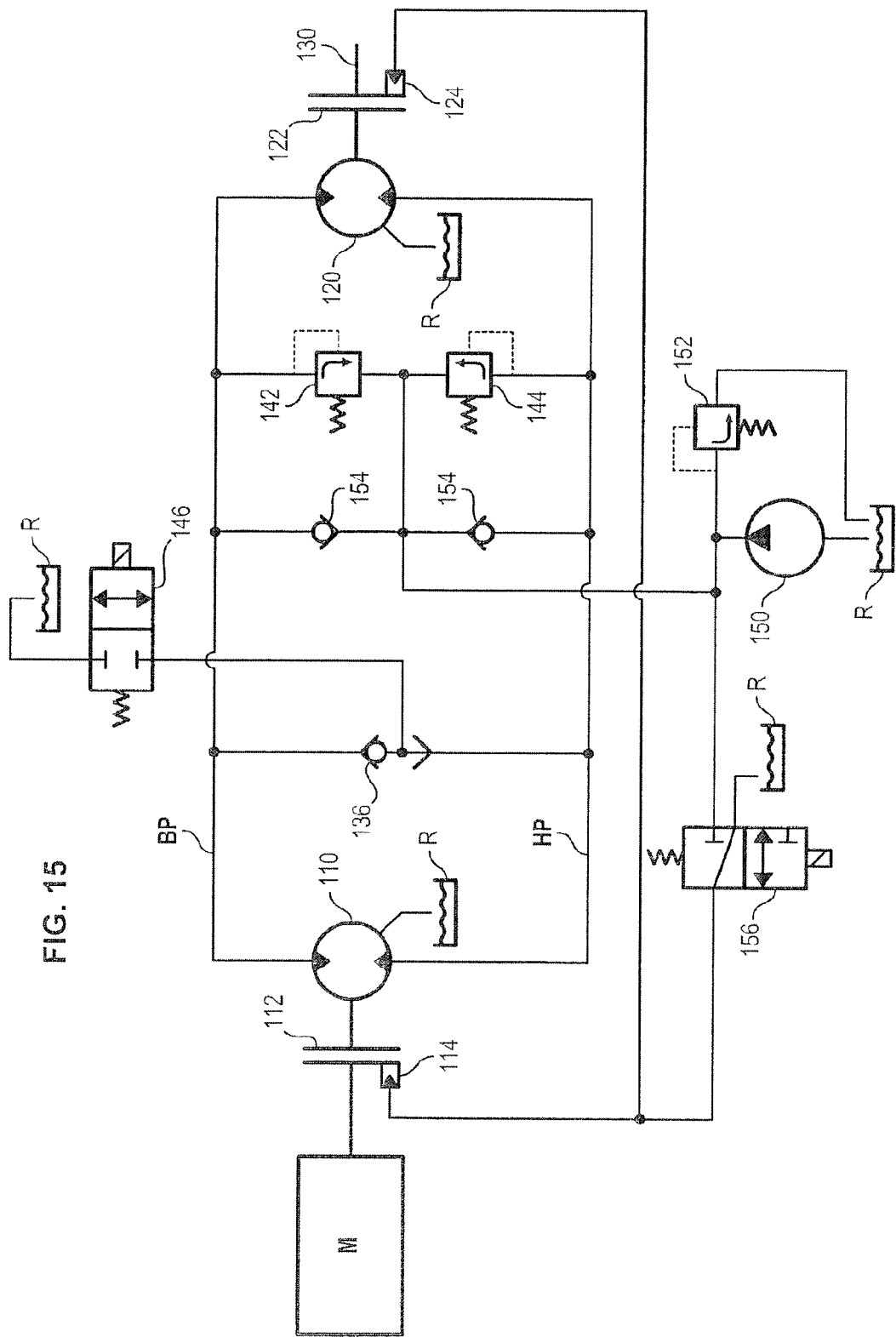
Figure 16:
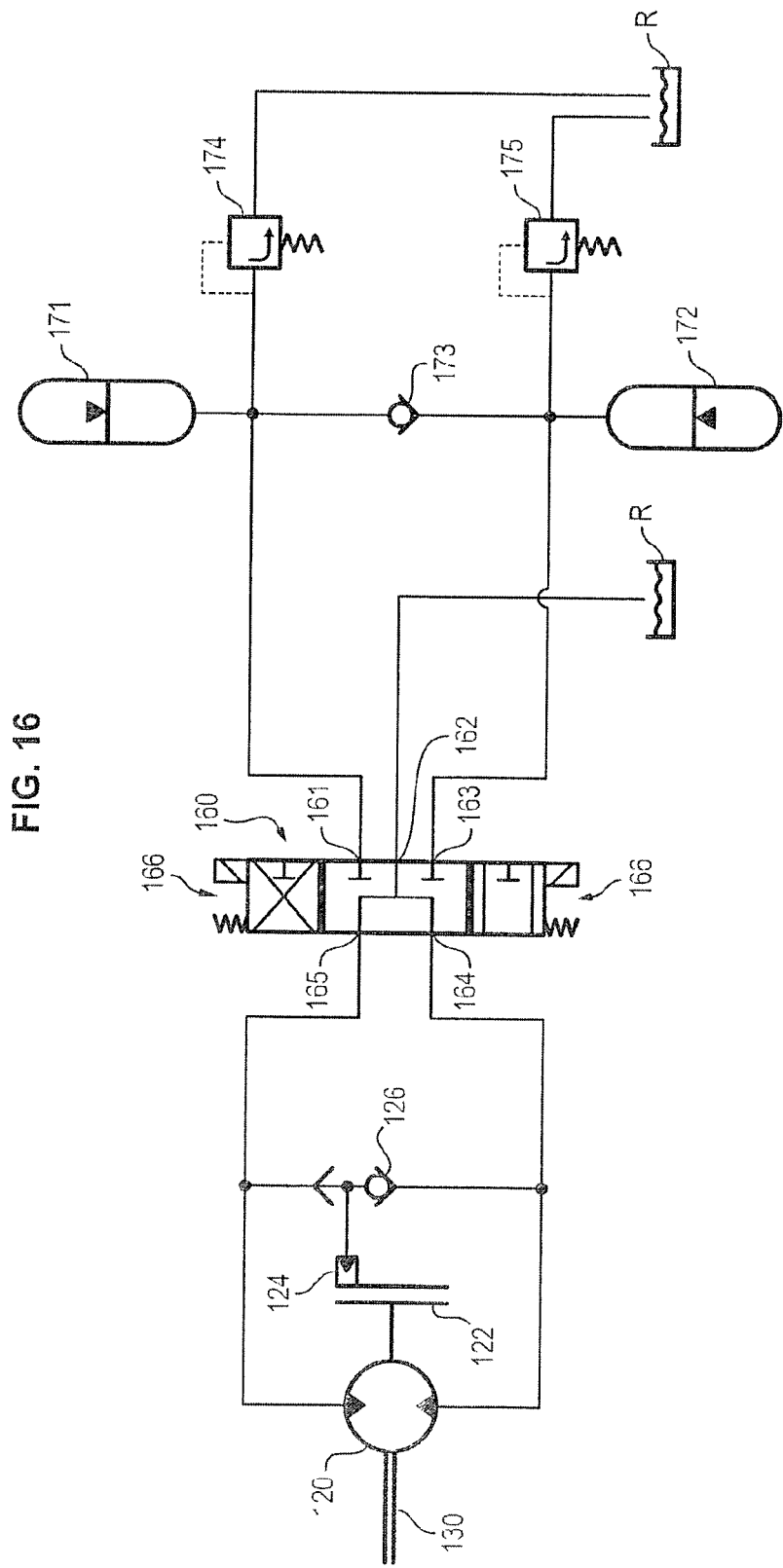

Other characteristics, aims and advantages of the invention will emerge from the following description which is purely illustrative and non-limiting, and which must be considered with respect to the attached diagrams, in which:

FIG. 1 shows a partial sectional view of a hydraulic apparatus according to an aspect of the invention, FIG. 2 shows a partial sectional view of a variant of a hydraulic apparatus according to an aspect of the invention, FIGS. 3 to 10 show partial sectional views of other variants of hydraulic apparatuses according to an aspect of the invention, FIGS. 11 and 12 show two views of an example of integration of a variant of a hydraulic apparatus according to an aspect of the invention on a vehicle axle, FIG. 13 shows a view of another variant of a hydraulic apparatus according to an aspect of the invention coupled with a differential for integration for example on a vehicle axle, FIGS. 14 to 16 show several examples of assemblies executing the hydraulic apparatuses according to an aspect of the invention.

In all figures, common elements are denoted by identical reference numerals.

DETAILED DESCRIPTION

FIG. 1 shows a partial sectional view of a hydraulic apparatus according to an aspect of the invention. This figure shows the axis of rotation X-X of the hydraulic apparatus 1.

The hydraulic apparatus 1 comprises a shaft 2, a cam 3 typically a multilobe cam, a cylinder block 4, a distributor 51, a distributor lid 52 and a casing 6.

The casing 6 and the shaft 2 are mounted turning relative to the other, typically by means of bearings, in this case two conical bearings 21.

In the following description, it will be considered that the shaft 2 is fixed and that the casing 6 is turning to illustrate an embodiment of the invention. But it is of course understood that the inverse configuration, that is, with a fixed casing 6 and a turning shaft 2 is also possible.

The cam 3 is typically formed by a ring adjacent to the axially internal face of the casing 6, and comprises on its radially internal surface a series of lobes equi-distributed about the axis X-X. Each of the lobes typically has an overall appearance of sinusoidal type. In the embodiment illustrated, the cam 3 is connected in rotationally fixed manner with the casing 6.

The cylinder block 4 is placed inside the ring forming the cam 3. It defines a plurality of cylinders 41 oriented radially relative to the axis X-X and terminating on the external peripheral face of the cylinder block 4 opposite the cam 3.

A piston 42 is mounted to slide radially respectively in each of the cylinders 41. Each piston 42 is supported on the radially internal surface of the cam 3.

The cylinder block 4 has a central bore by which it is engaged on the end of the shaft 2 of the hydraulic apparatus 1.

The distributor 51 and the distributor lid 52 are adapted to apply in a controlled manner pressurised fluid successively to each of the pistons 42, more precisely in the internal chamber of the cylinders 41 adjacent to the pistons, such that the successive support of the pistons 42 on the lobes of the cam 3 causes relative rotation of the cylinder block 4 and elements which are connected to it relative to the cam 3 and therefore to the casing 6 or inversely. For this purpose, there is dissymmetry between the number of lobes formed on the cam 3 and the number of connected pistons 42 located in the cylinder block 4.

A distribution plan 53 is defined between the distributor 51 and the cylinder block 4, corresponding to the faces of the distributor 51 and of the cylinder block 4 adapted to be put in contact with each other.

In the embodiment illustrated, the distributor lid 52 is connected in rotation to the shaft 2, while the distributor 51 is connected in rotation to the casing 6 by means not illustrated in detail.

The cylinder block 4 also comprises a spring 43 arranged in each of the cylinders 41 so as to be supported on the radially internal face of each of the pistons 42, and keep it supported against the cam 3 even in the absence of hydraulic pressure.

The hydraulic apparatus 1 according to an aspect of the invention also comprises engagement means 7 adapted, during application of a command, to immobilise the cylinder block 4 relative to the shaft 2.

In the embodiment illustrated, the engagement means 7 are mounted fixed about an end of the shaft 2 so as to be partially arranged between the cylinder block 4 and the shaft 2.

The engagement means 7 also have a support surface 71 adapted to engage the cylinder block 4. In the embodiment illustrated, the support surface is a radial collar, arranged so as to engage a lateral surface of the cylinder block 4 by friction.

Therefore, the engagement means 7 can be controlled so as to engage the cylinder block 4, and via application of a sufficient contact force, immobilise the cylinder block 4 relative to the engagement means 7, and therefore relative to the shaft 2. This immobilisation of the cylinder block 4 relative to the shaft 2 carries out displacement of the hydraulic apparatus 1, that is, its commissioning, as defined previously.

When the hydraulic apparatus 1 is not put into service, that is, when the engagement means do not connect the cylinder block 4 in rotation, the springs 43 keep the pistons 42 in contact with the cam 3.

The cylinder block 4 is therefore synchronised relative to the cam 3, that is, connected in rotation to the cam 3.

When the hydraulic apparatus 1 is put into service, that is, when the engagement means are activated, the cylinder block 4 is connected in rotation relative to the shaft 2, and therefore turning relative to the cam.

The springs 43 keep the pistons 42 in contact with the cam 3 and therefore force them to follow the cam 3 in the case of a driving hydraulic apparatus which shows a pump operation.

The movement of the pistons 42 involves auto-aspiration; and a hydraulic flow will be set up in the conduits of the associated hydraulic circuit.

In the case of a driven hydraulic apparatus, the application of pressure in the conduits of the associated circuit actuates the engagement means 7 so as to engage the cylinder block 4, while the cylinders 41 of the pistons 42 are fed, which operates the hydraulic apparatus 1.

The springs 43 have an active role when the engagement means are not actuated, in that they keep the pistons 42 in contact with the cam 3.

The cylinder block 4 is therefore synchronised relative to the cam 3, that is, connected in rotation to the cam 3.

Several variants can be envisaged for providing this immobilisation of the cylinder block 4 relative to the engagement means 7.

According to a first variant, an electro magnet is placed on the engagement means 7 or on the cylinder block 4, which produces a controllable control and immobilisation element.

Figure 6:
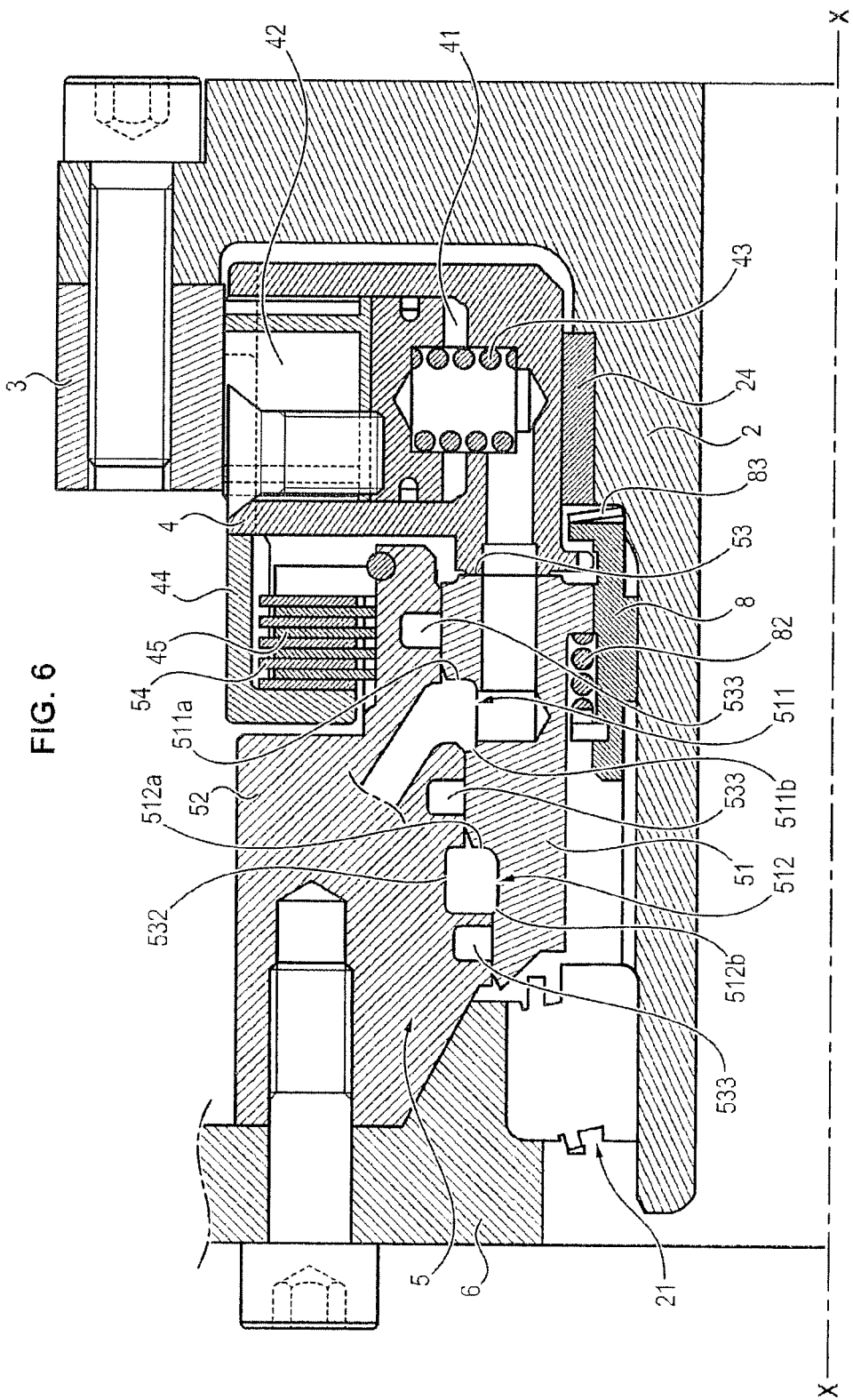

According to another embodiment, a friction track is placed on the engagement means 7 and/or on the cylinder block 4. An example of such an embodiment to be described hereinbelow in reference to FIG. 6 is the use of brake discs connected respectively to the engagement means 7 and the cylinder block 4, where its being put into contact will allow progressive immobilisation of the cylinder block 4 relative to the engagement means 7 and therefore relative to the shaft 2.

According to another variant, a dog-clutch device is used, that is, a device with teeth and grooves arranged on the engagement means 7 and on the cylinder block 4, for immobilising it in rotation when these teeth and grooves are engaged.

FIG. 2 shows a partial sectional view of a variant of a hydraulic apparatus according to an aspect of the invention.

In this variant, the shaft 2 is connected in rotation to the cam 3.

The distributor 51 is mounted fixed in rotation on the shaft 2, around the shaft 2, typically by means of grooves arranged at the surface of the shaft 2 cooperating with grooves made in a bore of the distributor 51.

The distributor lid 52 is mounted turning around the external periphery of the distributor 51, and is connected in rotation to the casing 6.

The shaft 2 comprises several sliding elements 24 arranged so as to allow rotation of the cylinder block 4 relative to the shaft 2. These sliding elements are for example pads, or ball, roller or needle bearings.

An elastic return element such as a spring 22 ensures the support of the distributor 51 against the cylinder block 4, with sufficient force so as to create sealing between these two elements 51 and 4.

Two mobile assemblies in rotation one relative to the other are defined:
  a first assembly defined by the casing 6 and the distributor lid 52, and
  a second assembly defined by the shaft 2, the cam 3 and the distributor 51, said first and second assemblies being free in rotation one relative to the other.

The cylinder block 4 is mounted turning relative to these two assemblies.

The engagement means 7 are here mounted on the distributor lid 52; these are a dog-clutch device such as described previously, that is, a device with teeth and grooves arranged on the engagement means 7 cooperating with teeth and grooves arranged on the cylinder block 4 and on the distributor lid 52.

The engagement means 7 can be shifted in translation according to the axis X-X so as to be arranged only on one or the other of the cylinder block 4 or of the distributor lid 52 and leave these elements 4 and 52 free in rotation one relative to the other, or so as to be astride between these two elements 4 and 52 and connect them in rotation.

The engagement means 7 therefore connect the cylinder block 4 in rotation with one of the assemblies defined previously, in this case the first assembly, that is, the assembly not comprising the cam 3.

Also, the distributor 51 such as illustrated comprises grooves 511 and 512 for conveying the fluid, which cooperate with grooves 521 and 522 arranged in the distributor lid 52 to form channels.

Grooves 523 enclosing the resulting channels are arranged in the distributor lid 52, these grooves forming housings adapted to receive dynamic sealing elements. The grooves 511 and 512 arranged in the distributor 51 are advantageously made so that each has two lateral walls 511*a*, 511*b*, 512*a* and 512*b*, these lateral walls being made such that for each of the grooves 511 and 512, the lateral wall which is the closest to the cylinder block 4 has a surface greater than that which is further away.

In reference to the embodiment presented in FIG. 2, the lateral walls 511*a* and 512*a* have a surface greater than the surfaces 511*b* and 512*b*.

Therefore, the pressurised fluid feed will tend to displace the distributor 51 towards the cylinder block 4 under the effect of the force resulting from the pressure applied to these walls 511*a* and 512*a*.

This particular configuration of the grooves 511 and 512 ensures auto-maintenance of the sealing between the cylinder block 4 the distributor 51. A spline 513 immobilises the distributor in rotation 51 relative to the shaft 2; the distributor 51 is rotationally fixed with the cam 3 to the extent where the latter is rotationally fixed with the shaft 2, for synchronising the feed of the pistons on the cam profile.

Figure 3:
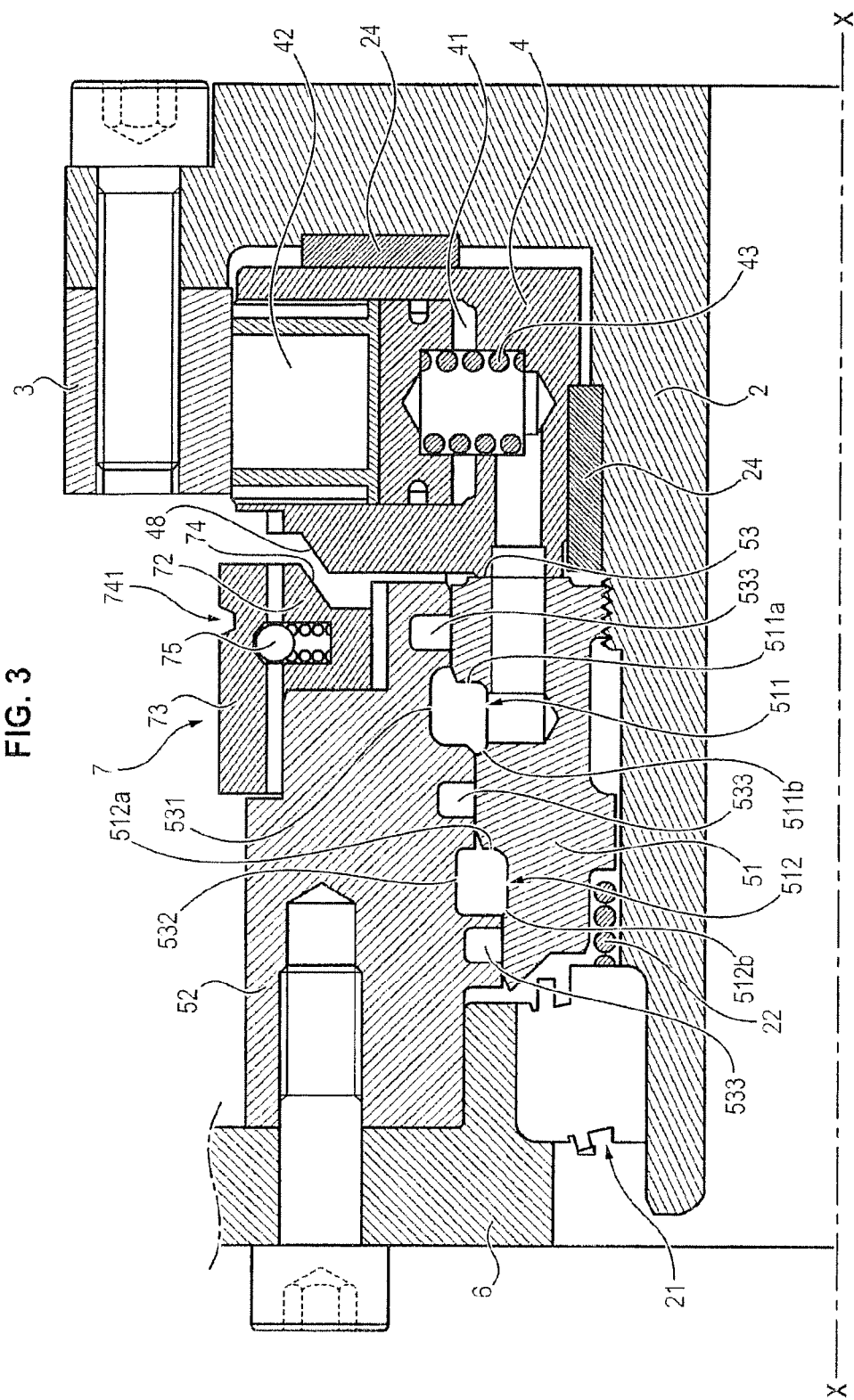

FIG. 3 presents a variant of the embodiment of the FIG. 2, in which the engagement means 7 combine a dog-clutch structure with friction surfaces adapted to produce synchronisation of the cylinder block 4 relative to the distributor lid 52 on which the engagement means 7 are mounted prior to the engagement of these two pieces via the dog-clutch.

The engagement means 7 are constituted by two mobile parts 72 and 73.

The first mobile part 72 is mounted sliding on the distributor lid 52, typically by means of grooves and complementary grooves, and has a friction surface 74 adapted to come into contact with a friction surface 48 of the cylinder block 4, the contacting of these surfaces 48 and 74 causing friction to create synchronisation of the cylinder block 4 with the distributor lid 52.

The second mobile part 73 is mounted sliding on the first mobile part 72, for example also by means of grooves and complementary grooves, and is adapted to engage with grooves and complementary grooves arranged on the cylinder block 4 once the latter is synchronised with the distributor lid 52.

A ball stop 75 releases the second mobile part 73 in translation only once the synchronisation between the distributor lid 52 and the cylinder block 4 is created due to engagement of the friction surfaces 74 and 48. In fact, engagement of dog-clutch type such as produced by this second mobile part 73 is advantageously created statically, that is, when the two relevant elements are immobilised one relative to the other.

During application of a command, the engagement means 7 connect the cylinder block 4 and the distributor lid 52 in rotation with the first assembly, that is, the assembly not comprising the cam 3.

The engagement means 7 can also comprise a peripheral groove 741 allowing its displacement via a lever or any other system engaging it.

Figure 4:
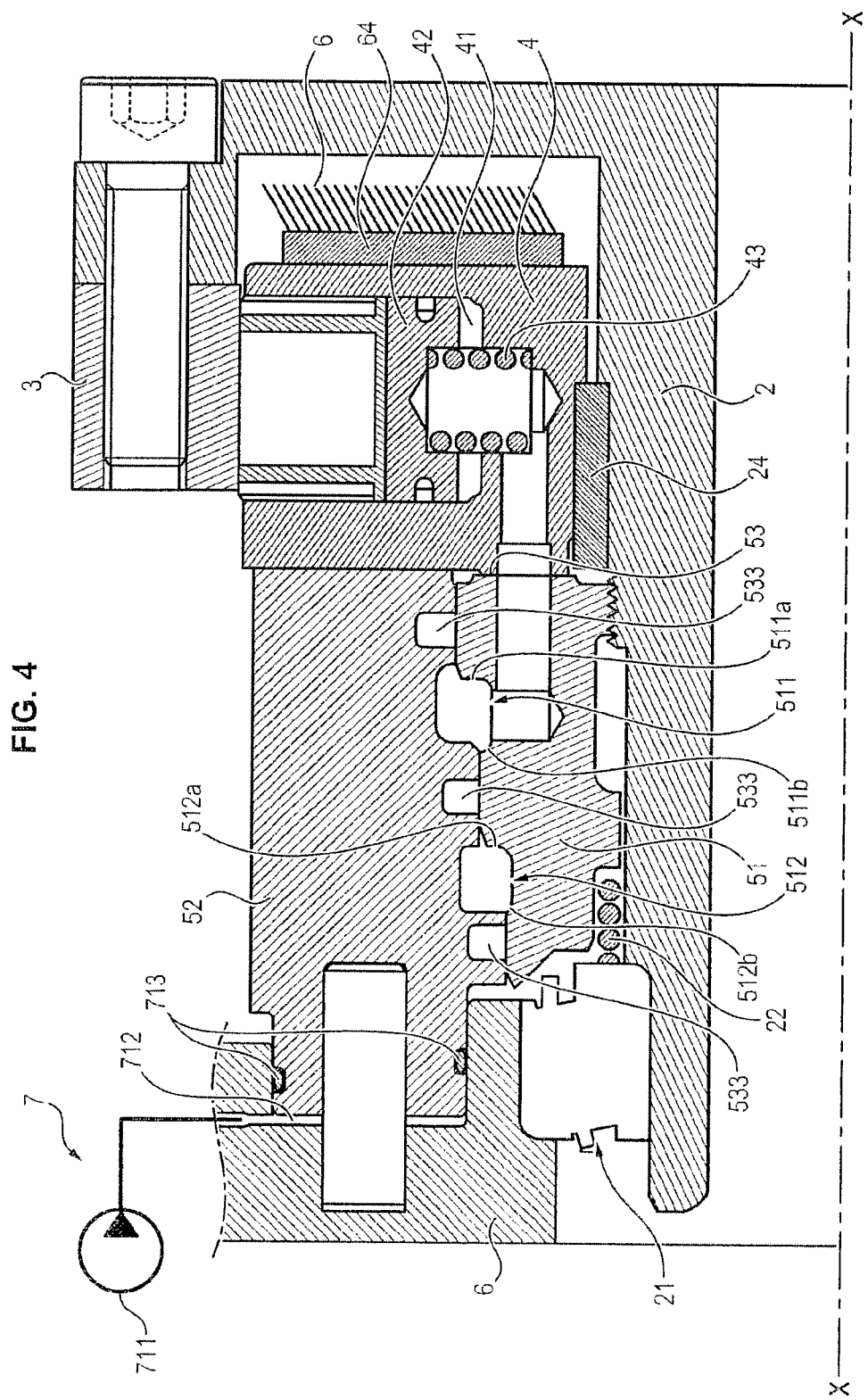

FIG. 4 shows another variant of a hydraulic apparatus 1 according to the invention, in which the engagement means 7 are a source of pressure feed adapted to apply pressure to an adapted surface of the distributor lid 52, and apply pressure to the cylinder block 4 and connect the cylinder block 4 with the piece 6 in rotation.

The source of pressure feed is illustrated here schematically as a hydraulic pump 711, which can for example be a boost pump, adapted to feed a localised volume 712 with pressure between the casing 6 and the distributor lid 52, and apply pressure on the latter so as to shift it towards the cylinder block 4, which is now supported against a friction pad 64 connected to the casing 6, the pressure applied in the volume 712 being adapted to produce immobilisation of the cylinder block 4 relative to the casing 6 due to friction between the cylinder block 4 and the friction pad 64.

The distributor lid 52 and/or the casing 6 advantageously comprise sealing means 713 ensuring sealing of the volume 712 in which the pressure is applied.

The engagement means 7 connect the cylinder block 4 in rotation with the first assembly during application of a command, that is, the assembly not comprising the cam 3.

According to another embodiment of this variant, the friction pad is arranged at the interface between the cylinder block 4 and the distributor lid 52, while the cylinder block 4 is supported on a sliding pad arranged on the shaft 2. The application of the pressure inside the volume 712 causes immobilisation of the cylinder block 4 relative to the distributor lid 52, and therefore relative to the casing 6 due to friction between the cylinder block 4 and the friction pad of the distributor lid 52.

Figure 5:
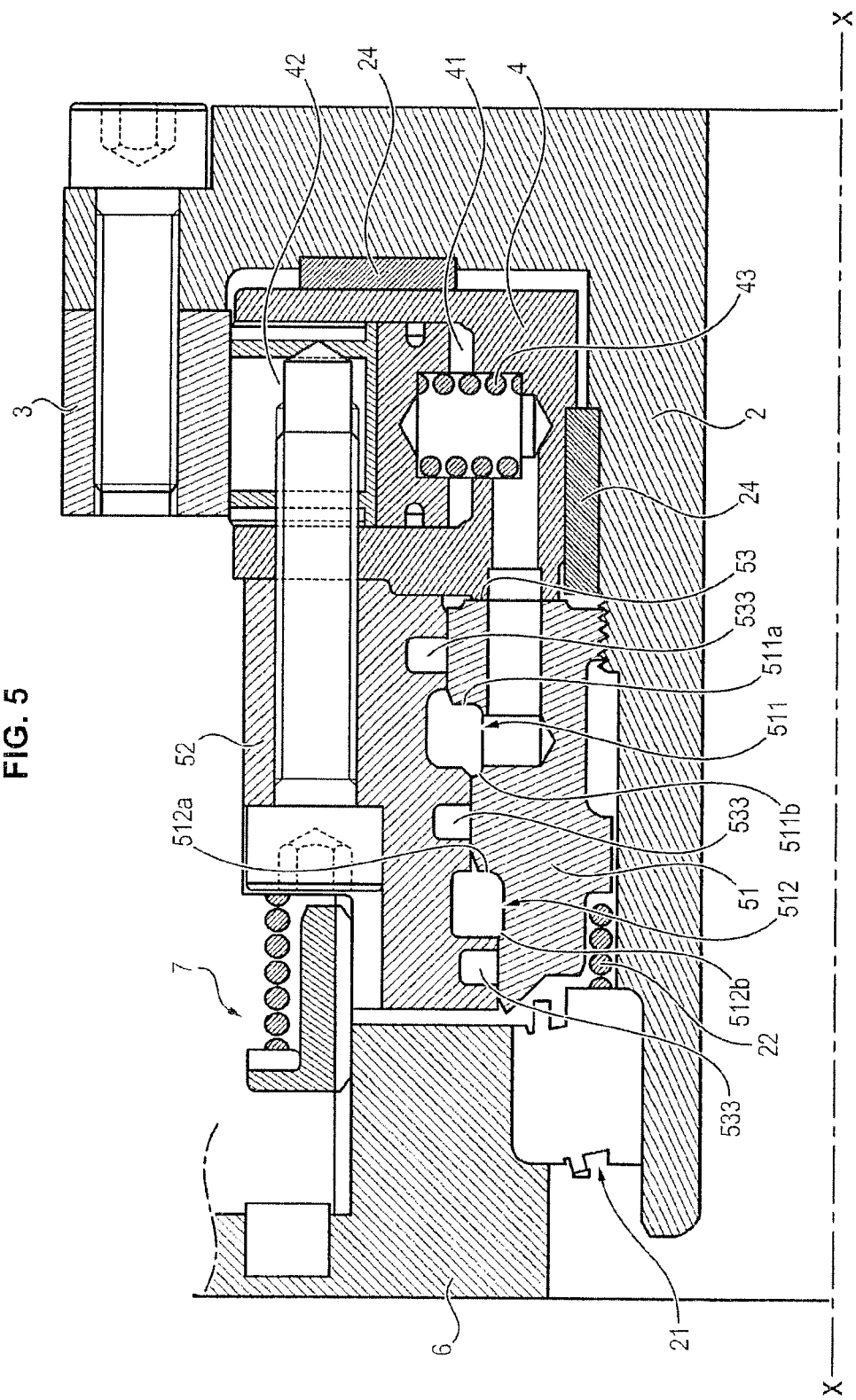

FIG. 5 shows another variant of a hydraulic apparatus 1 according to the invention such as presented previously in FIG. 2.

In this variant, the distributor lid 52 is connected in rotation to the cylinder block 4 via an indexation element, for example a screw or a bolt, and mounted free in rotation relative to the casing 6.

Two mobile assemblies in rotation one relative to the other are defined:
 a first assembly defined by the casing 6, and
 a second assembly defined by the shaft 2, the cam 3 and the distributor 51, said first and second assemblies being free in rotation one relative to the other.

The cylinder block 4 and the distributor lid 52 are mounted turning relative to these two assemblies.

The engagement means 7 are here a dog-clutch device such as described previously, that is, a device with teeth and grooves arranged on the engagement means 7 cooperating with teeth and grooves arranged on the casing 6 and on the distributor lid 52.

The engagement means 7 connect the cylinder block 4 and the distributor lid 52 in rotation with the first assembly, that is, the assembly not comprising the cam 3 during application of a command.

FIG. 6 shows a partial sectional view of a variant other than a hydraulic apparatus according to an aspect of the invention.

In this variant, the shaft 2 is connected in rotation to the cam 3.

The distributor 51 is mounted fixed in rotation on the shaft 2, around the shaft 2, typically by means of splines arranged at the surface of the shaft 2 cooperating with grooves made in a bore of the distributor 51.

The distributor lid 52 is as such mounted turning around the distributor 51, and is connected in rotation to the casing 6.

As in the preceding embodiments, the cylinder block 4 is arranged so that the pistons 42 are in the ring forming the cam 3, and are kept in contact with the cam 3 by means of the spring 43.

The cylinder block 4 is associated here with a disc tray 44 to which it is connected in rotation, this disc tray 44 comprising a plurality of discs 45 uniformly spaced.

The distributor lid 52 also comprises a plurality of complementary discs 54 which are arranged alternating with the discs 45 of the disc tray 44.

These two groups of discs 45 and 54 have a function similar to conventional brake discs; they are configured to alternate between a configuration in which they are not in contact and leave the distributor lid 52 and the cylinder block 4 free in rotation one relative to the other, and a configuration in which they are in contact and immobilise the distributor lid 52 and the cylinder block 4 one relative to the other under the effect of friction.

A support element 8 is here arranged around the shaft 2, between the shaft 2 and the distributor 51. The engagement means are connected in rotation to the shaft 2 and the distributor 51, typically by means of grooves and splines, and is mobile in translation according to the axis X-X.

The support element 8 comprises a compression spring 82 positioned so as to produce compression force of the distributor 51 against the cylinder block 4, supported tightly between the distributor 51 and the cylinder block 4.

An elastic washer 83 is positioned supported on the shaft 2 and acts on the support element 8 in opposition to the compression force exerted by the compression spring 82, producing its return to the disengaged position of the discs 45 and 54, that is, the position of the system in which the cylinder block 4 is free in rotation relative to the distributor 51, and therefore relative to the casing 6. The washer 83 and the compression spring 82 are configured so as to maintain the close support between the distributor 51 and the cylinder block 4, whether the hydraulic apparatus is fed by pressure or not.

It is understood that the washer 83 and the compression spring 82 can be replaced by other adapted elastic means.

When operating, the pressure feed will tend to displace the distributor 51 towards the cylinder block 4 under the effect of the force resulting from the pressure applied to these walls 511a and 512a as described previously. With the distributor 51 being supported against the cylinder block 4, the latter will also be displaced in the same direction, that is, in the direction of moving away relative to the distributor lid 52. This relative displacement of the cylinder block 4 relative to the distributor lid 52 will cause engagement of the discs 45 and 54, and connect in rotation the cylinder block 4 relative to the assembly comprising the casing 6 and the distributor lid 52, causing commissioning of the hydraulic apparatus 1.

To disengage the hydraulic apparatus, that is, put it in a configuration in which the flow is zero, it suffices therefore to stop supplying it with pressure; when the pressure applied on the walls 511a and 512a of the distributor 51 reaches a given threshold value, the discs 54 and 45 disengage, releasing the cylinder block 4 in rotation relative to the distributor lid 52 and the casing 6.

The engagement means are therefore formed here by the combination of the discs 45 and 54 and of the support element 8, ensuring engagement or not in rotation of the cylinder block 4 relative to the casing 6 and the distributor lid 52.

Figure 7:
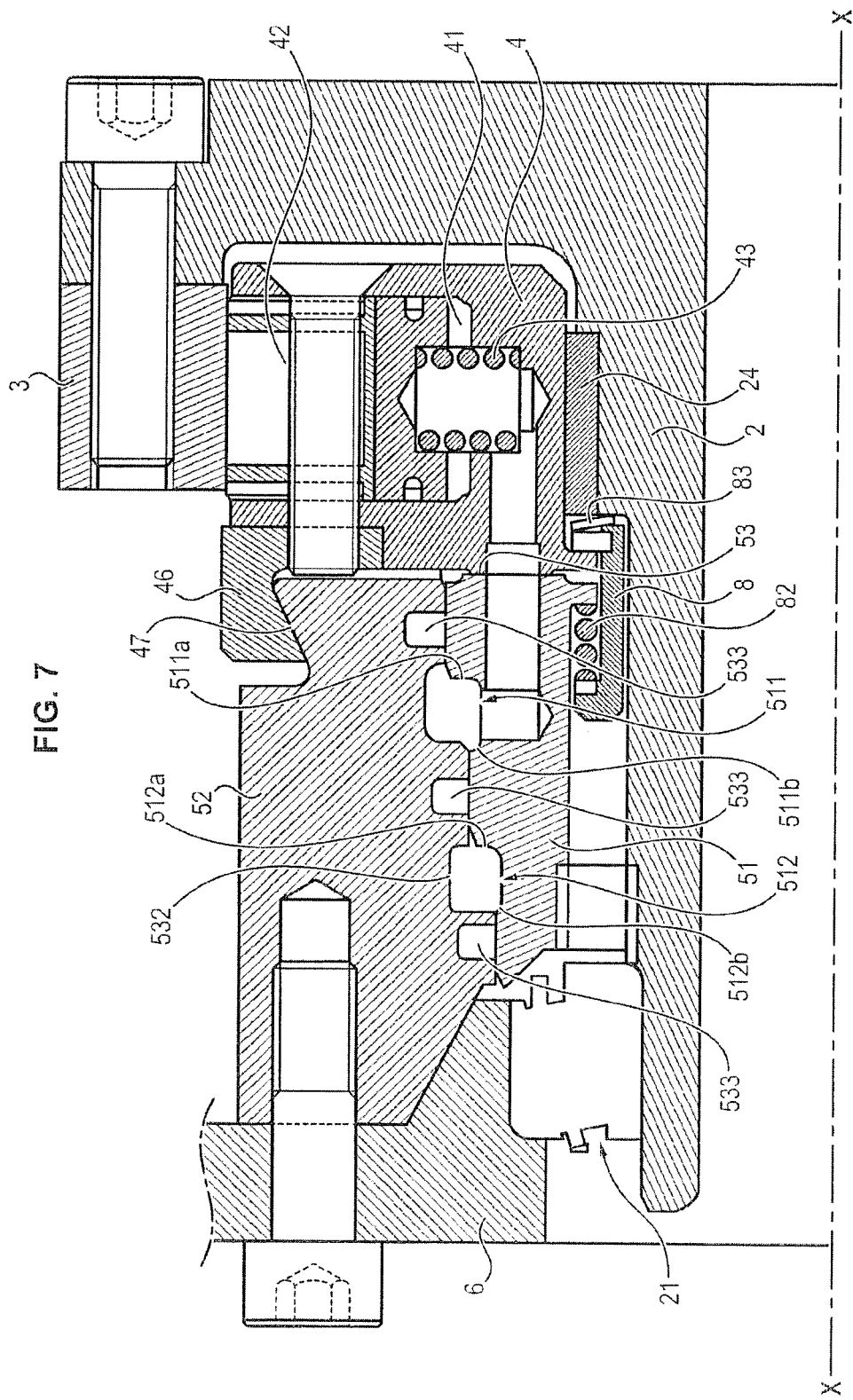

FIG. 7 presents another variant of a hydraulic apparatus according to an aspect of the invention.

This variant has a function similar to that presented in FIG. 6, in which the discs 45 and 54 have been replaced by two conical half-shells 46 and 47 connected in rotation respectively to the cylinder block 4 and the distributor lid 52.

These two conical half-shells 46 and 47 are configured so that when the cylinder block 4 and the distributor lid 52 are shifted in the direction of moving away one relative to the other, the surfaces of these two conical half-shells 46 and 47 engage by friction, and connect the cylinder block 4 and the distributor lid 52 in rotation.

As for the embodiment presented in FIG. 6, the pressure feed will tend to displace the distributor 51 towards the cylinder block 4 under the effect of the force resulting from the pressure applied to these walls 511a and 512a, as described previously. With the distributor 51 being supported against the cylinder block 4, the latter will also be displaced in the same direction, that is, in the direction of moving away relative to the distributor lid 52. This relative displacement of the cylinder block 4 relative to the distributor lid 52 will cause engagement of the two conical half-shells 46 and 47, and connect the cylinder block 4 in rotation relative to the assembly comprising the casing 6 and the distributor lid 52, causing commissioning of the hydraulic apparatus 1.

Disengaging the hydraulic apparatus therefore means stopping to supply it with pressure; so when the pressure applied to the walls 511a and 512a of the distributor 51 reaches a given threshold value, the two conical half-shells 46 and 47 disengage, releasing the cylinder block 4 in rotation relative to the distributor lid 52 and the casing 6.

As in the previous embodiment, the engagement means are therefore formed here by the combination of the two conical half-shells 46 and 47 and the support element 8, ensuring engagement or not in rotation of the cylinder block 4 relative to the casing 6 and the distributor lid 52.

Figure 8:
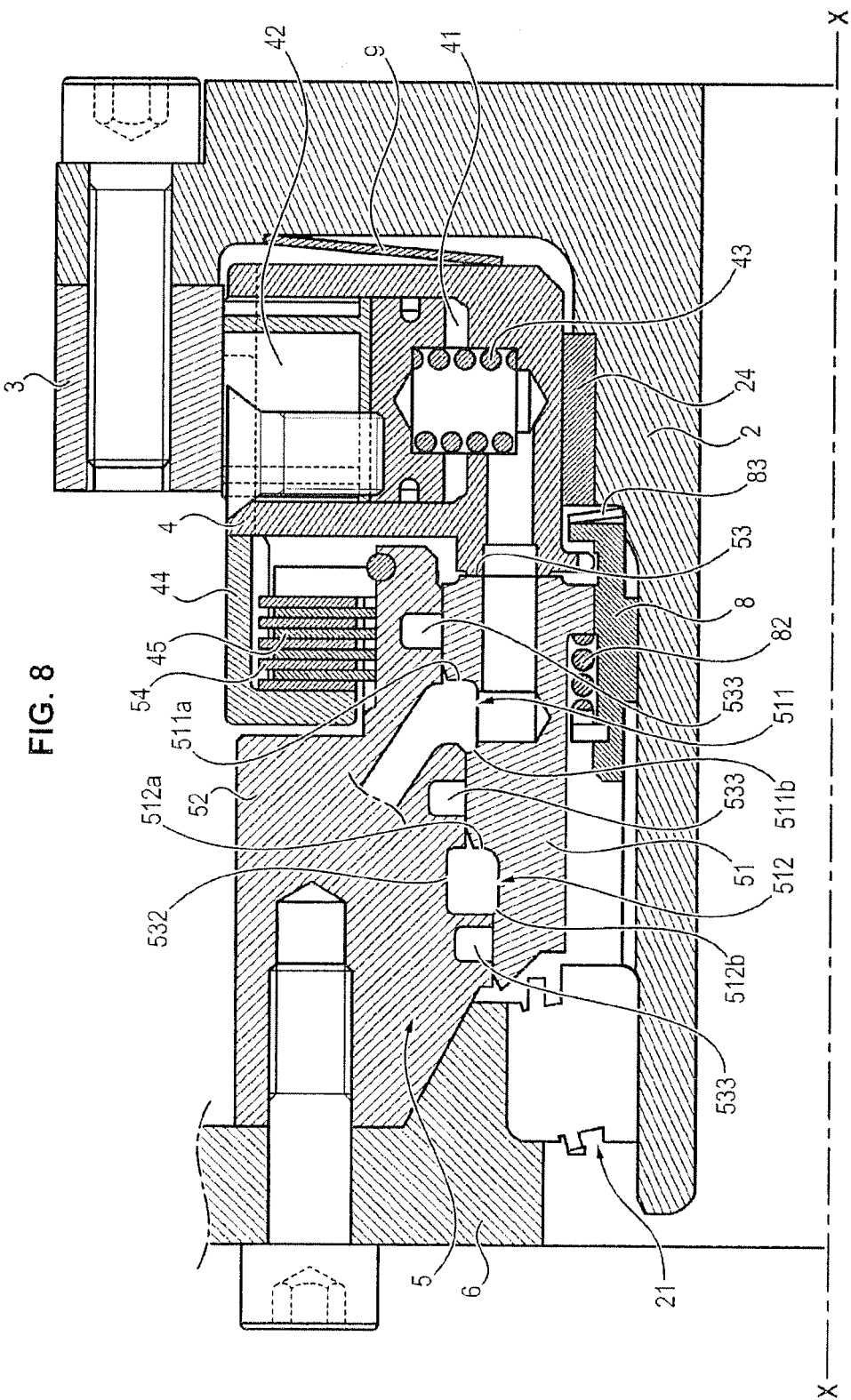

FIGS. 8 and 9 illustrate two other variants having a function similar to that presented in reference to FIGS. 6 and 7.

FIG. 8 shows a variant of FIG. 6 in which the support element 8, the compression spring 82 and the washer 83 have been omitted.

Return means 9 are arranged so as to tend to displace the cylinder block 4 to disengage it in rotation relative to the distributor lid 52 and the casing 6, by disengaging the discs 45 of the cylinder block of the complementary discs 54 of the distributor lid 52, that is, by disengaging the clutch existing between the cylinder block 4 and the casing 6 formed by the discs 45 and 54.

In the embodiment illustrated, the return means 9 is a compression spring of washer type, commonly designated by the name Belleville washer.

Also, the return means 9 ensure holding of the cylinder block 4 in contact with the distributor 51, and therefore produce sealing between these two pieces to perform the operation of the hydraulic apparatus 1 by supplying the pistons 42 of the cylinder block 4.

As already shown in reference to the preceding figures, the distributor 51 such as illustrated comprises grooves 511 and 512 for conveying fluid, which cooperate with grooves 521 and 522 arranged in the distributor lid 52 to form channels.

Grooves 523 enclosing the channels formed in this way are arranged in the distributor lid 52, these grooves forming housings adapted to receive dynamic sealing elements.

The grooves 511 and 512 arranged in the distributor 51 are advantageously made so as to each present two lateral walls 511a, 511b, 512a and 512b, these lateral walls being made such that for each of the grooves 511 and 512, the lateral wall which is the closest to the cylinder block 4 has a surface greater than that which is further away from it.

In reference to the embodiment shown in FIG. 8, the lateral walls 511a and 512a have a surface greater than the surfaces 511b and 512b. The diameter of the distributor 51 increases as it approaches its contact surface with the cylinder block 4. The distributor 51 can be qualified as stepped distributor.

Therefore, the pressurised fluid feed will tend to shift the distributor 51 towards the cylinder block 4 under the effect of the force resulting from the pressure applied to these walls 511*a* and 512*a*.

This particular configuration of the grooves 511 and 512 ensures auto-maintenance of the sealing between the cylinder block 4 and the distributor 51. The distributor 51 is connected in rotation to the shaft 2; the distributor 51 is rotationally fixed with the cam 3 to the extent where the latter is rotationally fixed with the shaft 2 to synchronise the feed of the pistons on the cam profile.

A similar function can be achieved by arranging a thrust chamber, in the distributor 51, arranged so that its pressure feed causes displacement of the distributor 51 towards the cylinder block 4.

During fluid feed, displacement of the distributor 51 towards the cylinder block 4 under the effect of the force resulting from the pressure applied to the walls 511*a* and 512*a* causes engagement of the discs 45 and 54, connecting the cylinder block 4 to the casing 6 in rotation and causing displacement of the hydraulic apparatus 1.

The engagement means 7 are therefore formed here by
the combination of the discs 45 and 54 forming a clutch between the cylinder block 4 by means of the disc tray 44 and the casing 6 by means of the distributor lid 52),
the return means 9, and
the configuration of the distributor 51 causing displacement of the distributor 51 towards the cylinder block 4 during the application of pressure.

FIG. 9 shows another embodiment in which the cylinder block 4 is adapted to be connected in rotation to the shaft 2 during application of a command; the cylinder block 4 comprises a plurality of discs 45 adapted to cooperate with a plurality of other discs 25 connected to the shaft 2.

The function is similar to that of the embodiment shown in FIG. 8.

In the absence of pressure feed by the distributor 51, the return means 9, illustrated here as a Belleville washer, keep the cylinder block 4 supported against the distributor 51, and disengages the discs 45 and 25 forming the clutch between the cylinder block 4 and the shaft 2.

During the fluid feed, the stepped structure of the distributor 51 causes displacement of the distributor 51 towards the cylinder block 4, and engagement of the discs 45 and 25, connecting the cylinder block 4 in rotation to the shaft 2 and causing displacement of the hydraulic apparatus 1.

Such a fixed cam structure 3 is advantageous in terms of wear; when the hydraulic apparatus 1 is not operating, the cam 3, the cylinder block 4, the distributor 51 and the distributor lid 52 are immobile, preventing especially wear on the sealing elements between these pieces.

Several other types of return means 9 can be utilised. Particular examples are the use of a friction pad with one or more compression springs, a pulling element associated with a compression spring mounted on the distributor 5. The return means 9 can also be mounted supported on another element of the hydraulic apparatus 1, as it holds the cylinder block 4 against the distributor 51.

FIG. 10 shows another embodiment in which the cylinder block 4 is adapted to be connected in rotation to the shaft 2 during the application of a command.

In this embodiment, the link in rotation between the cylinder block 4 and the shaft 2 is created by a synchronisation element in rotation and by dentures.

The synchronisation element such as presented is a synchronisation piston 91, connected in rotation to the shaft 2 for example by means of splines. The synchronisation piston 91 is mounted sliding according to the axis X-X, and is coupled to a washer 92 arranged supported on the shaft 2 performing a spring function between the shaft 2 and the synchronisation piston 91.

The cylinder block 4 and the shaft 2 each have splines, respectively 94 and 95, arranged so as to engage when the cylinder block is displaced according to the axis X-X so as to stop on the shaft 2.

Displacement of the cylinder block 4 according to the axis X-X is typically done under the effect of the fluid feed of the distributor 51 which causes a compression force of the distributor 51 on the cylinder block 4.

The embodiment illustrated also comprises an actuating piston 96 adapted to create compression force on the cylinder block 4 and ensure displacement conjointly with the effect of the fluid feed of the distributor 51.

The cylinder block 4 comprises one or more housings in the form of angular sectors arranged opposite the synchronisation piston 91. Contact between the piston 91 and the cylinder block is made by friction such that contact between the cylinder block 4 and the synchronisation piston 91 causes engagement in rotation of the cylinder block 4 relative to the synchronisation piston 91 and therefore relative to the shaft 2.

The form of angular sectors of the housings enables engagement in rotation of the cylinder block 4 relative to the synchronisation piston 91 and enables angular lateral play between these two elements.

In this way, two stop positions of the synchronisation piston 91 on the cylinder block 4 against two different walls of the housings are defined, as a function of the directions of rotation of the turning part of the hydraulic apparatus 1.

These two stop positions align the internal conduits of the cylinder block 4 and of the distributor 51 in their appropriate configuration according to the direction of operation of the hydraulic apparatus 1, that is, the directions of rotation of its turning part.

Once this first engagement in rotation is completed, the cylinder block 4 continues its displacement according to the axis X-X until the splines 94 and 95 of the cylinder block 4 and of the shaft 2 respectively engage, forming dog-clutch engagement between the cylinder block 4 and the shaft 2. The washer 92 enables translation of the synchronisation piston 91 with the cylinder block 4 according to the axis X-X.

Displacement is therefore done twice, during displacement of the cylinder block 4 according to the axis X-X;
first, floating engagement of the cylinder block 4 is achieved so as to position its internal conduits in the planned configuration and to create speed synchronisation which prevents the noise of engagement of the teeth of the dog-clutch links, and then
second, this floating engagement of the cylinder block 4 is locked by engagement of dog-clutch type with the shaft 2.

Displacement is adapted to the direction of operation of the hydraulic apparatus 1 due to floating engagement of the cylinder block 4 which enables positioning of the internal conduits adapted to the direction of rotation of the hydraulic apparatus 1.

FIGS. 11 and 12 illustrate a structure showing an operation such as described in reference to FIG. 9, integrated in an assembly comprising a differential connected to two half-shafts driving wheels.

In this embodiment, the casing 6 is fixed, and the hydraulic apparatus 1 is associated with a differential 23 arranged in the casing 6.

The cam 3, the distributor 51 and the distributor lid 52 are here connected in rotation to the casing 6, the shaft 2 being a turning shaft.

The differential 23 mounted on the shaft 2 of the hydraulic apparatus 1, and is connected to two half-shafts 2a and 2b which can turn at different speeds. The body (commonly called a cage) of the differential 23 is connected in rotation to the shaft 2.

This variant applies for example to providing assistance on an axle of a vehicle, the two half-shafts 2a and 2b each being connected to a wheel, respectively 2c and 2d. It suffices therefore to start a pump to feed the hydraulic apparatus 1 so that the latter engages and operates as a motor to provide hydraulic assistance on the shaft 2, in this case a vehicle axle.

These different variants comprising a stepped distributor 51 and return means 8 or 9 ensuring close contact between the cylinder block 4 and the distributor 51 form a compact and robust system by limiting the use of dynamic sealing means.

Engagement in rotation of the cylinder block 4 occurs progressively; the higher the pressure delivered by the distributor 51, the greater the friction force between the discs 45 of the clutch of the cylinder block 4 and the complementary discs 54 or 25.

More generally, given a hydraulic apparatus 1 according to an aspect of the invention two mobile assemblies in rotation one relative to the other are defined:
  a first assembly defined by the casing 6, and
  a second assembly defined by the shaft 2, said first and second assemblies being free in rotation one relative to the other.

The cylinder block 4 is mounted free in rotation relative to said first and second assemblies.

The cam 3 is connected in rotation to one or the other of these assemblies; for example to the first assembly in the embodiment illustrated in FIG. 1, and to the second assembly in the embodiment illustrated in FIG. 2.

The engagement means 7 provide immobilisation of the cylinder block 4 relative to the other of said first or second assemblies during application of a command, for example the pressure feed of the hydraulic apparatus 1 or the engagement of an actuator such that the cylinder block 4 and the cam 3 are each connected in rotation to a assembly different, creating displacement of the hydraulic apparatus.

The engagement means 7 can act directly on the cylinder block 4 such as for example in the embodiment illustrated in FIG. 1 where the engagement means come into direct contact with the cylinder block 4 to immobilise it in rotation, or indirectly via action exerted on another element, such as for example the distributor lid 52 in the embodiment illustrated in FIG. 2 or the distributor 51 in the embodiment shown in FIG. 1.

Immobilisation of the cylinder block 4 relative to one or the other of the assemblies is advantageously done progressively, for example by progressive application of contact force to produce and gradual progressive commissioning.

The engagement means 7 can especially be actuated by a boost pump of a hydraulic circuit associated with the hydraulic apparatus.

Also, the springs 43 applying the pistons 42 to the cam 3 imply that the hydraulic apparatus 1 is self-suctioning as already specified previously in reference to FIG. 1, that is, this hydraulic apparatus 1 can be used as a pump without needing to be coupled to a boost pump to avoid the risk of cavitation.

In fact, since the cylinder block turns 4 relative to the cam 3, aspiration occurs due to contact between the pistons 42 and the cam 3, which cancels out the risk of cavitation.

The invention provides commissioning of the hydraulic apparatus 1 at a non-zero speed and zero flow. The move is made from a disengaged configuration in which the flow is zero, to a configuration in which the relative rotation of both assemblies causes fluid flow.

Contrary to hydraulic apparatuses according to the prior art, it is not necessary to carry out transitory phases of progressive pressure increase to perform the extension of pistons and pressurising of the closed loop of the associated hydraulic circuit or of the casings.

In fact, commissioning can be done progressively to the point of immobilisation of the cylinder block 4 relative to one or the other of the assemblies, for example under the effect of friction, this immobilisation which in some variants can be doubled by means of a dog-clutch or any other adapted locking means.

The boost pump is optional and minimised, if needed, its function being limited to compensation of any leaks.

The invention has particular application on the hydraulic assistance circuits of vehicles, for example trucks, agricultural vehicles or construction equipment, or even on service vehicles, or even automobiles. In the case of a hydraulic apparatus 1 with revolving casing 6 and a shaft 2 fixed such as described previously, the hydraulic apparatus 1 is typically arranged so that its fixed part forms a wheel spindle, the revolving casing being connected to the wheel.

Commissioning of the hydraulic apparatus 1 typically shifts from transmission of traction or propulsion type to transmission of four-wheel drive type. For example, in the case of a vehicle with four wheels having a principal motor driving its front wheels, the rear wheels can advantageously be equipped with such hydraulic apparatuses 1 and shift to four-wheel drive transmission during commissioning of these hydraulic apparatuses.

FIG. 13 shows another variant of a use of a hydraulic apparatus according to an aspect of the invention.

The discs 45 and 25 are arranged here in a sealed chamber 56 with pressure controlled by means of a control chamber 57.

The control chamber 57 is connected to the conduits of the distributor 51. The sealed chamber 56 is filled with oil.

The control chamber 57 is configured to control the pressure inside the sealed chamber 56, modifying the viscosity of the oil in the sealed chamber 56. The rise in viscosity of the oil in the sealed chamber 56 produces engagement of the discs 45 and 25 by visco-coupling. In the absence of the application of pressure by the control chamber 57, the oil inside the sealed chamber 56 has low viscosity and therefore does not create engagement of the discs 45 and 25.

A free wheel control, for example a washer spring, is arranged to release pressure inside the sealed chamber 56 and shift the hydraulic apparatus 1 into free wheel configuration.

This engagement by visco-coupling has several advantages. It performs a clutch function without friction, therefore reducing wear relative to a conventional clutch of dog-clutch type. The risk of noise during the clutch is also reduced.

According to a particular application, there can be chain-mounting of several hydraulic apparatuses 1 according to the invention on a vehicle.

A first hydraulic apparatus is mounted on a wheel axle, and a second hydraulic apparatus on a driving axle connected to a motor such as a thermal motor of the vehicle. When the aim is to activate hydraulic assistance, the two hydraulic apparatuses need to be put into service, the second hydraulic apparatus having a pump operation so as to feed the first hydraulic apparatus which operates as a motor and drives the associated wheel axle.

FIG. 14 shows an embodiment of such mounting.

This mounting comprises a hydraulic circuit C, comprising two hydraulic apparatuses 110 and 120 operating respectively as pump and motor.

These two hydraulic apparatuses 110 and 120 are each coupled to a clutch, 112 and 122 respectively.

The clutch 112 executes coupling of the pump 110 to a bloc motor M, typically a thermal motor which can be linked to a gearbox.

The clutch 122 executes coupling of the hydraulic motor 120 to a shaft 130, for example a vehicle axle.

In the embodiment illustrated, the clutches 112 and 122 are controlled by hydraulic controls respectively 114 and 124, adapted to initiate the associated clutch when control pressure is applied, and disengage it when the pressure applied is less than a given threshold value.

These hydraulic controls 114 and 124 are each doubled by a primary control, respectively 115 and 125, the clutches 112 and 122 which can each be triggered either by a single primary or hydraulic control, or by the combined effect of both controls. In the embodiment illustrated, the primary controls 115 and 125 are electric controls, given that other variants are possible, especially by means of pneumatic, mechanical or even hydraulic controls.

The hydraulic circuit C has a line connecting the admission of the hydraulic pump 110 to the backflow of the hydraulic motor 120, and a line connecting the backflow of the hydraulic pump 110 to the admission of the hydraulic motor 120. To use an operation example, these lines will be designated respectively by BP and HP corresponding to the low-pressure line and the high-pressure line of the circuit C.

The circuit C such as illustrated comprises two shuttle valves 116 and 126, each connecting the line HP to the line BP, and delivering pressure to the hydraulic controls 114 and 124 respectively.

These shuttle valves 116 and 126 are configured so as to take off the higher pressure of the two lines HP and BP, in this case the high-pressure line connected to the backflow of the hydraulic pump 110, and convey it to their respective hydraulic controls 114 and 124.

The hydraulic circuit C also comprises overpressure valves 142 and 144 adapted for evacuation of fluid in the circuit C, these overpressure valves being connected respectively to the line BP and to the line HP, and being configured so as to be passing when the pressure in the line to which they are connected exceeds a threshold value.

These two overpressure valves are connected to a distributor 146 and create an interrupter function to enable or not emptying of the lines HP and/or BP.

Also, the hydraulic apparatuses 110 and 120 have their respective casings connected together by the same drain line 117, in turn connected to the lines HP and BP respectively by check valves 118 and 119.

This common drain line 117 creates equilibrium between the pressure in the casings of the hydraulic apparatuses 110 and 120 with the high-pressure HP line to execute disengagement of the hydraulic apparatus. It also executes aspiration of leaks from the hydraulic apparatuses 110 and 120 towards the hydraulic circuit C; the check valves 118 and 119 perform a resupply function of the hydraulic circuit C, and perform a self-suctioning system not needing booster means.

The drain line 117 typically also comprises a breather tube 127, or evacuation system for oil vapour to the exterior.

In a mounting also comprising a gearbox, the drain line 117 is advantageously also connected to the casing of this gearbox, which provides a system having a drain line typically fitted with a single breather tube for the gearbox and the hydraulic apparatuses. The drain creates a reserve for the oil feed to the two hydraulic apparatuses.

In operation, there is an initial state where the two clutches 112 and 122 are disengaged; the hydraulic pump 110 and the hydraulic motor 120 are therefore disengaged and the flow into the hydraulic circuit is zero.

To start up hydraulic assistance on the shaft 130, the primary control 115 of the clutch 112 is actuated so as to couple the hydraulic pump 110 to the motor M, and set up a flow in the circuit C via the hydraulic pump 110, which defines the high-pressure lines HP and low-pressure lines BP as a function of its direction of operation.

Next, the primary control 125 is actuated so as to couple the hydraulic motor 120 with the shaft 130. In the case of a hydraulic motor 120 with a stepped distributor as shown previously especially in reference to FIGS. 6, 7, 8, and 9, the feed from the hydraulic motor 120 will cause engagement in rotation of the cylinder block 4 relative to one or the other of the assemblies such as defined previously, and will start the hydraulic motor 120 displacement.

Also, setting pressure in the lines HP and BP will cause application of pressure via the controls 114 and 124 which take off pressure in the line HP as described previously, ensuring holding by clutches 112 and 122 in the clutch position.

The system now engaged therefore drives the shaft 130 in rotation and provides hydraulic assistance, ensuring its operating maintenance.

Disengagement of the assistance can be done either by ceasing to actuate the primary controls 115 and 125 or by applying inverse primary controls, going in the direction of disengagement of a clutch or the clutches 112 and/or 122, and/or via the distributor 146 to empty the lines HP and BP by sending the fluid to the casing of the motor 120 and/or the pump 110. The torque of the clutches 112 and 122 can also be decreased so as to lower it below the threshold value for driving the associated hydraulic apparatus.

The mounting associated with the hydraulic apparatuses 1 according to an aspect of the invention is therefore simple to achieve, and needs no multiple switching elements to set up several pressure levels for commissioning the hydraulic apparatuses 1.

According to a particular embodiment, the hydraulic pump 110 is mounted on a primary vehicle axle, connected to one or more motorised wheels, while the hydraulic motor 120 is mounted on a secondary vehicle axle. The primary axle is driven by a primary motor, typically thermal.

The hydraulic pump 110 therefore turns at the same speed as the motorised wheels of the primary axle of the vehicle, and the hydraulic motor 120 turns at the same speed as the secondary axle of the vehicle.

When the hydraulic pump 110 and the hydraulic motor 120 are disengaged, only the primary motor ensures driving of the vehicle.

When the hydraulic pump 110 and the hydraulic motor 120 are put into service, the hydraulic pump 110 takes off the torque of the primary axle, and transmits it to the secondary axle via the hydraulic motor 120 which ensures its driving.

This provides integral transmission, with a 1:1 ratio between the rotation speeds of the hydraulic pump 110, the hydraulic motor 120 and the wheels of the vehicle, close to losses and leaks of the hydraulic circuit.

This type of mounting of hydraulic apparatuses on axles especially does without reduction ratios inherent in former mountings of hydraulic apparatuses on power take-offs of thermal motors or on speed shafts, and proposes a simplified structure for executing hydraulic assistance on a vehicle.

As a variant, the hydraulic pump 110 can supply two hydraulic motors, each reconnected to a half-axis of an axle driving a wheel.

FIG. 15 shows a variant of the previous mounting.

This mounting also comprises two hydraulic apparatuses 1 such as shown previously, one 110 operating as a pump and the other 120 operating as a motor. This diagram shows the drain lines of the casings of these hydraulic apparatuses 110 and 120, connected each to the tank R at ambient pressure.

As earlier, this mounting carries out commissioning of both hydraulic apparatuses to provide hydraulic assistance on the shaft 130 coupled to the motor 120 via the clutch 122.

The overpressure valves 142 and 144 are arranged so as to discharge any pressure excess from the lines HP and BP into the circuit C or into the casings of the hydraulic apparatuses 110 and 120.

The distributor 146 here performs an emptying function of the lines HP and BP, by discharging the higher pressure of these two lines into the tank R, this higher pressure of the two lines HP and BP being taken off by means of a shuffle valve 136.

This mounting comprises a boost pump 150 which takes off fluid in the tank R, and feeds the circuit. It is linked to an overpressure valve 152 and discharges any pressure excess to the tank R.

This boost pump 150 is also linked to an engagement distributor 156 for connecting the hydraulic controls 114 and 124 respectively controlling the clutches 112 and 122 either at the boost pump 150 or at a tank R at ambient pressure. Therefore, activation of the engagement distributor 156 executes engagement of both clutches 112 and 122, and therefore the commissioning of both hydraulic apparatuses 110 and 120.

FIG. 16 shows another variant in which the hydraulic apparatus is fed by accumulators, which creates a power-recovery circuit.

This diagram again shows a hydraulic apparatus 120 according to the invention, connected to a shaft 130, said hydraulic apparatus here operating as a motor. The commissioning of this motor 120 is controlled by means of the clutch 122, which is in turn controlled by the hydraulic control 124.

A shuffle valve 126 taps off the higher pressure of the two hydraulic branches connected to the motor 120, and applies it to the control 124.

The pressure feed is achieved by means of two accumulators 171 and 172. To illustrate an operating example, here the accumulator 171 is a high-pressure accumulator and the accumulator 172 is a low-pressure accumulator.

A check valve 173 is arranged between these two accumulators to prevent the pressure being over the level of the low-pressure accumulator 172 relative to the pressure at the level of the high-pressure accumulator 171.

Two overpressure valves 174 and 175 discharge any excess pressure into a tank R at ambient pressure.

The circuit such as shown also comprises a distributor 160 having five orifices:

a first orifice 161 connected to the high-pressure accumulator 171,
a second orifice 162 connected to the tank R,
a third orifice 163 connected to the low-pressure accumulator 172,
a fourth orifice 164 and a fifth orifice 165 reconnected to the admission and the backflow of the motor 120.

This distributor is controlled by control means 166 comprising especially hydraulic, electric, pneumatic or electric controls and return means such as springs ensuring return to the equilibrium position of the distributor 160 in the absence of a control command.

This distributor 160 can alternate between three configurations to be described hereinbelow.

In a first configuration, which is the configuration illustrated in FIG. 16, the fourth and fifth orifices 164 and 165 are connected to the second orifice 162, while the first and third orifices 161 and 163 are closed. This configuration therefore connects the admission and the backflow of the motor 120 to the tank R; there is no pressure to trigger the clutch 122, and the motor 120 is therefore disengaged.

In a second configuration, the first orifice 161 is connected to the fifth orifice 165, the third orifice 163 is connected to the fourth orifice 164, and the second orifice 162 is closed.

This configuration therefore connects the motor 120 to the accumulators 171 and 172, which therefore defines a high-pressure line and a low-pressure line, in this case respectively the line connected to the high-pressure accumulator 171 and the line connected to the low-pressure accumulator 172 triggers the clutch 122 and commissions the motor 120 so that it drives the shaft 130 in rotation.

The third configuration is similar to the second configuration, but reverses the links of the first and third orifices 161 and 163 with the fourth and fifth orifices 164 and 165 reversing the directions of rotation of the motor 120.

Whether the first or third configuration, the motor 120 is fed with pressure by the high-pressure accumulator, and then discharges into the low-pressure accumulator which performs a power-recovery function.

As for the circuits shown in the preceding figures, this circuit exploits the advantageous structure of the hydraulic apparatus according to the invention, in this case the motor 120, performing simple commissioning, without wear or noise, which produces a simplified circuit which is therefore reduced in terms of bulk, cost and mass.

In the particular case of application on a vehicle comprising a primary motor adapted to selectively drive a hydraulic pump with variable displacement equipped with a clutch or not, and N driven axles with N a natural whole number greater than or equal to 1, each of said axles being fitted with a hydraulic apparatus such as described previously connected together so that the hydraulic apparatuses of the driven axles are mounted in parallel relative to the hydraulic apparatus of the driving axle.

The vehicle is advantageously also equipped with a calculator which receives information characteristic of the speed of the driven motors connected to the wheels and information characteristic of the drive speed of the pump in rotation.

The calculator runs displacement adjustment of the hydraulic pump as soon as it is started such that displacement of the pump multiplied by its drive speed in rotation is equal to displacement of all the N motors multiplied by the drive speed of the driven motors connected to the wheels plus Epsilon.

The value Epsilon represents sliding which produces a traction effect. Epsilon can be zero or very low at the moment of clutching.

The predicted displacement of the motors can take into account a rate of leak or losses of the circuit.

When starting the pump, the clutch of the hydraulic apparatus or hydraulic apparatuses such as described previously and operating as a motor can be done concomitantly, or after a brief delay. When the motors are fed, but not clutched, they can turn without torque at a speed approaching that of the shaft on which they are placed, which is an advantageous situation favouring a clutch without shocks, particularly if the link system of the cylinder block to the casing is of dog-clutch type. At this moment, even though the pump flows and the motors turns, there is very little torque being supplied, and the difference in pressure between the hydraulic feed and return lines is very slight.

When the pressure is set in the closed loop of the hydraulic circuit, creating a low-pressure return line and a high-pressure feed line, the calculator controls displacement of the pump as a function of the variations in pressure in the hydraulic circuit, for example by means of accurate pressure readings at different points of the circuit.

Once the hydraulic motor or the hydraulic motors is clutched, a difference in pressure in the hydraulic lines proportional to the torque provided by the motors will be created, and control of the pump as a function of pressure becomes possible. The control displacement of the hydraulic pump can be varied, either as torque or speed, to provided traction or containment of the driven axles as well known to those skilled in the art. This control from pressure information can be activated from the moment when a difference in pressure greater than a predetermined threshold preferred by those skilled in the art appears between the hydraulic feed and return lines. It can also be activated after a delay following clutching or any other means for detecting that the clutch of the motors is effective.

This particular embodiment enables more immediate driving by the driven motor, causing fewer skidding, wear or noise forces, and preventing shocks or pressure peaks.

Coupled with the progressive effect of the clutch without shock of the hydraulic apparatus such as presented, and particularly if it is progressive, the result is particularly supple and silent engagement of the hydraulic assistance.

The invention claimed is:

1. A hydraulic apparatus with radial pistons, comprising:
   a casing defining a first assembly,
   a shaft defining a second assembly, said first and second assemblies being free in rotation one relative to the other,
   a multilobe cam connected in rotation to one of said first and second assemblies,
   a distributor and a distributor lid,
   a cylinder block mounted free in rotation relative to said first and second assemblies, and comprising a plurality of cylinders in which said radial pistons are arranged to slide radially in the respective cylinders of the cylinder block and supported on the lobes of the cam, said apparatus comprises support springs arranged in said cylinders so as to keep the pistons supported against the cam, characterized in that said hydraulic apparatus also comprises engagement means in rotation adapted, during the application of a command, to immobilise the cylinder block relative to one of said first and second assemblies and, upon release of the command, to disengage the cylinder block relative to the other of said first and second assemblies.

2. The hydraulic apparatus according to claim 1, wherein said engagement means are adapted to provide engagement by friction of said cylinder block with the other of said first and second assemblies.

3. The hydraulic apparatus according to claim 1, wherein one of said support springs has a stiffness greater than the stiffness of said other support springs so as to define indexation of the cylinder block relative to the cam when the cylinder block is free in rotation relative to said first and second assemblies.

4. The hydraulic apparatus according to claim 1, wherein said cam is connected in rotation to the shaft, the engagement means being adapted to connect in rotation the cylinder block to the casing.

5. The hydraulic apparatus according to claim 1, wherein said cam is connected in rotation to the casing, the engagement means being adapted to connect in rotation the cylinder block to the shaft.

6. The hydraulic apparatus according to claim 1, wherein one of said first and second assemblies is mobile in rotation relative to the other, the apparatus further comprising a synchronisation piston connected in rotation to the other of said first and second assemblies and adapted to cooperate with a housing arranged in the cylinder block, said housing forming an angular sector so as to define two stop positions of the synchronisation piston in said housing, said two stop positions defining two configurations of internal conduits of the distributor and of the cylinder block corresponding to two directions of rotation of a mobile assembly of said hydraulic apparatus, said synchronisation piston (91) being configured so as to position the cylinder block in one of the stop positions adapted prior to immobilisation by the engagement means of the cylinder block relative to the other of said first and second assemblies.

7. The hydraulic apparatus according to claim 1, wherein said engagement means comprise
   return means tending to move the cylinder block to disengage the cylinder block in rotation relative to one of said first and second assemblies, and
   internal conduits of the distributor configured, during the application of pressure, to engage the cylinder block in rotation relative to the other of said first and second assemblies.

8. The hydraulic apparatus according to claim 1, wherein said engagement means comprise an electro-magnet, configured so as to, during activation of the electro-magnet, generate a magnetic field which causes an attraction force between the cylinder block and a friction element so as to immobilise the cylinder block relative to the other of said first and second assemblies.

9. The hydraulic apparatus according to claim 1, wherein said engagement means comprise a device with teeth and grooves arranged on the engagement means adapted to cooperate with teeth and grooves arranged on the cylinder block or on one of said first and second assemblies so as to immobilise the cylinder block relative to the other of said first and second assemblies.

10. The hydraulic apparatus according to claim 1, wherein said engagement means comprise
    a sealed chamber filled with oil and housing discs connected in rotation to the cylinder block and to the other of said first and second assemblies, and
    a control chamber adapted to control a pressure inside the sealed chamber, so as to produce engagement by viscocoupling.

11. The system comprising the hydraulic apparatus according to claim 1 and a second hydraulic apparatus according to claim 1, wherein a first of said hydraulic apparatuses is connected to a principal motor via a clutch so as to function as a pump, and via a hydraulic circuit feed a second of said hydraulic apparatuses operating as a motor to provide assistance on a drive shaft of a vehicle wheel, said first and second hydraulic apparatuses comprising a common drain line, the respective casings of the first and second hydraulic apparatuses connected to said hydraulic circuit via check valves.

12. The system comprising at least one hydraulic apparatus according to claim 1 operating as a motor and said at least one hydraulic apparatus is mounted on a driven axle of a vehicle, and a hydraulic pump with variable displacement, said system further comprising a calculator adapted to control the displacement of the hydraulic pump such that the displacement of the hydraulic pump multiplied by a drive speed in rotation of the hydraulic pump is equal to a displacement of a total of said at least one hydraulic motor multiplied by a drive speed of the driven hydraulic motor connected to the axles plus Epsilon, where Epsilon represents sliding which produces a traction effect.

13. A vehicle comprising a primary motor driving a primary axle in rotation defining the motorised wheels of the vehicle, and a secondary axle, said vehicle comprising a primary hydraulic apparatus according to claim 1 mounted on said primary axle so as to be driven in rotation at the same speed as said motorised wheels, and a secondary hydraulic apparatus according to claim 1 mounted on the secondary axle so as to be driven in rotation at the same speed as the at least one wheel mounted on said secondary axle, said hydraulic primary and secondary apparatuses being connected so as to enable driving of the secondary axle by the secondary hydraulic apparatus during the commissioning of said hydraulic apparatuses.

14. The hydraulic apparatus according to claim 1, wherein the shaft comprises at least one sliding element arrange so as to allow rotation of the cylinder block relative to the shaft.

15. A method for displacement of a hydraulic apparatus comprising a casing defining a first assembly, a shaft defining a second assembly, said first and second assemblies being free in rotation one relative to the other, a multilobe cam connected in rotation to one of said first and second assemblies, a cylinder block mounted free in rotation relative to said first and second assemblies, and comprising a plurality of cylinders in which pistons are arranged guided to slide radially in respective cylinders of the cylinder block, supported on the lobes of the cam and being held supported against the cam, support springs arranged in said cylinders so as to keep the pistons supported against the cam, engagement means in rotation adapted, during the application of a command, to immobilise the cylinder block relative to the other of said first and second assemblies and, upon release of the command, to disengage the cylinder block relative to the other of said first and second assemblies, said method being characterized in that immobilisation of the cylinder block by said engagement means relative to the other of said first and second assemblies is controlled so as to execute displacement of the hydraulic apparatus.

16. The method according to claim 15, wherein immobilisation of the cylinder block relative to the other of said first and second assemblies is done by application of pressure in a distributor of said hydraulic apparatus driving the displacement of said distributor so that the distributor acts on the cylinder block to immobilize the cylinder block relative to the other of said first and second assemblies, said pressure being for example applied by a boost pump.

* * * * *